Oct. 20, 1970         H. R. KANN         3,534,517
STRUCTURAL SUPPORT ARRANGEMENT AND METHOD OF ASSEMBLING
Original Filed Oct. 21, 1965         11 Sheets-Sheet 1
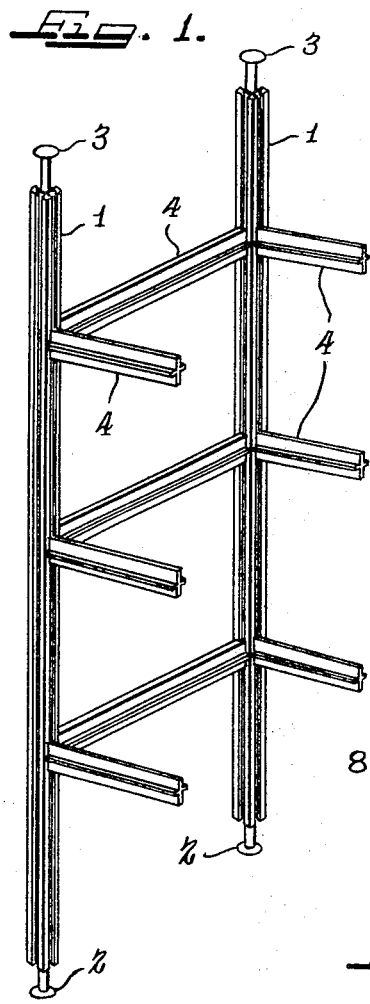
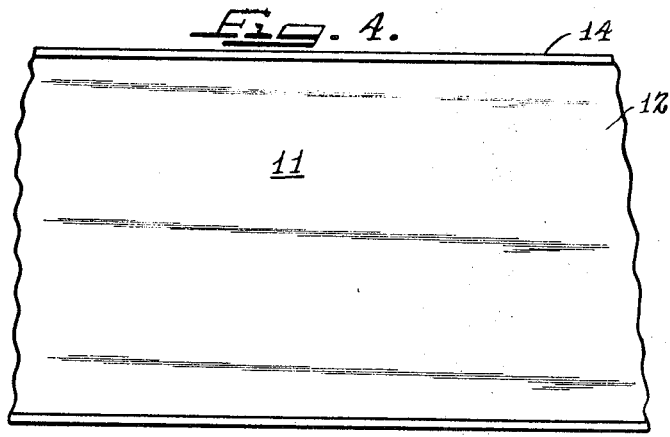
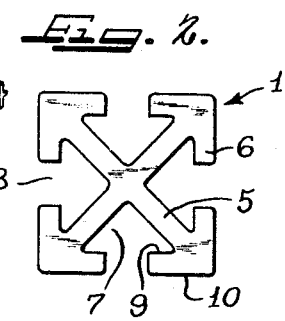
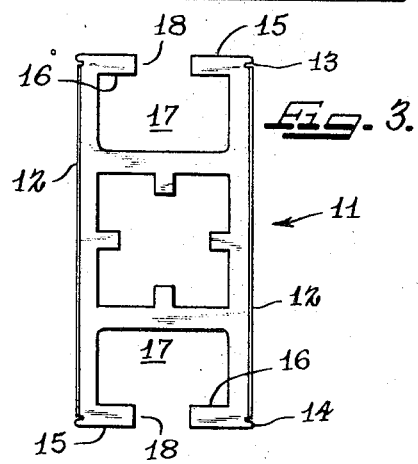
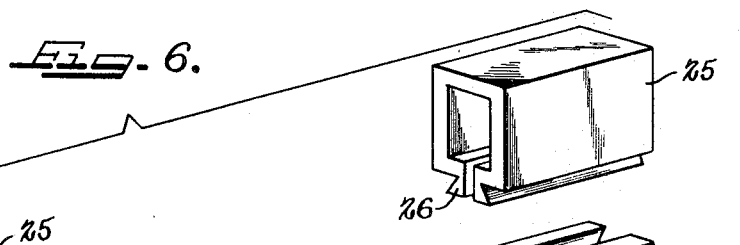
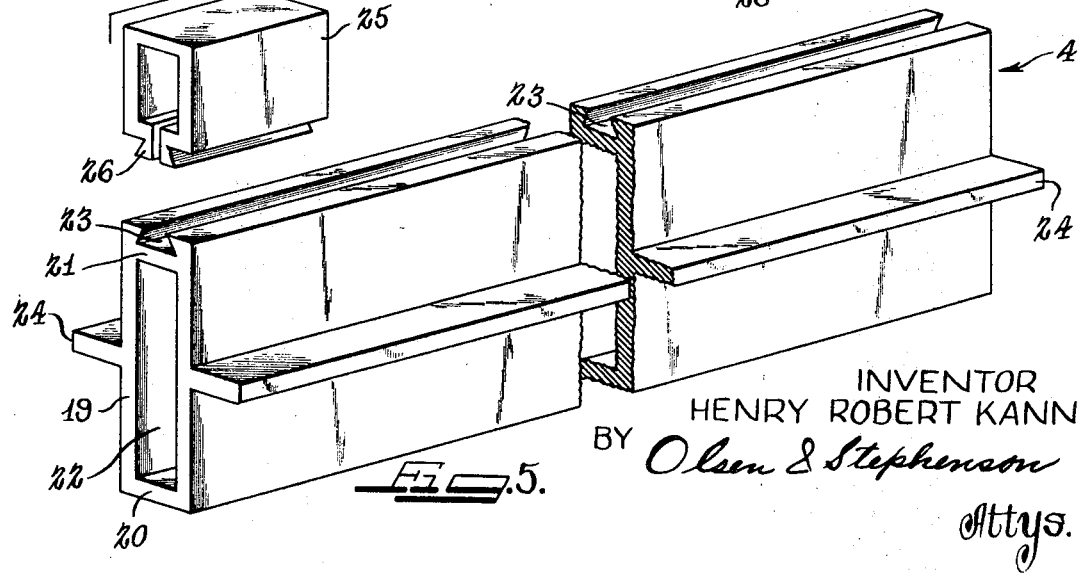
INVENTOR
HENRY ROBERT KANN
BY Olsen & Stephenson
Attys.

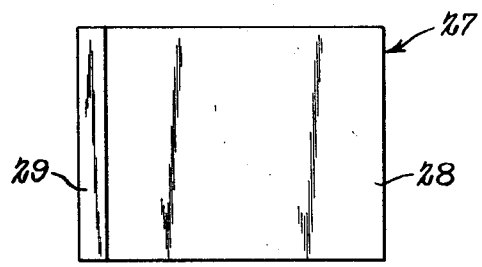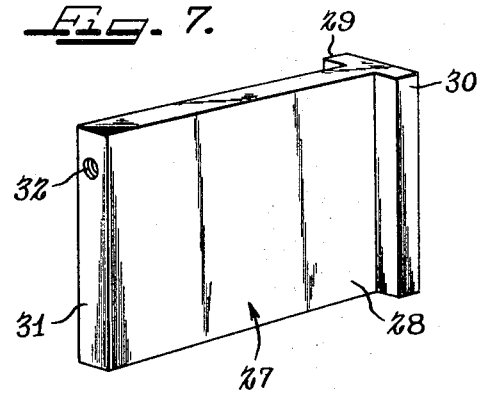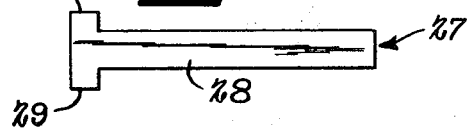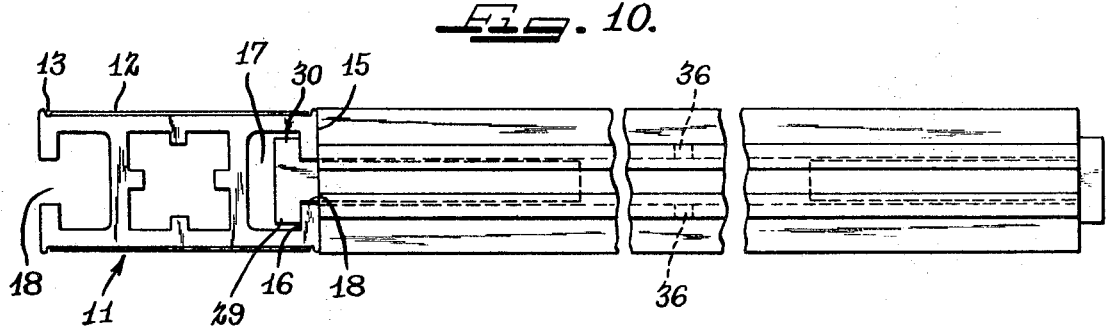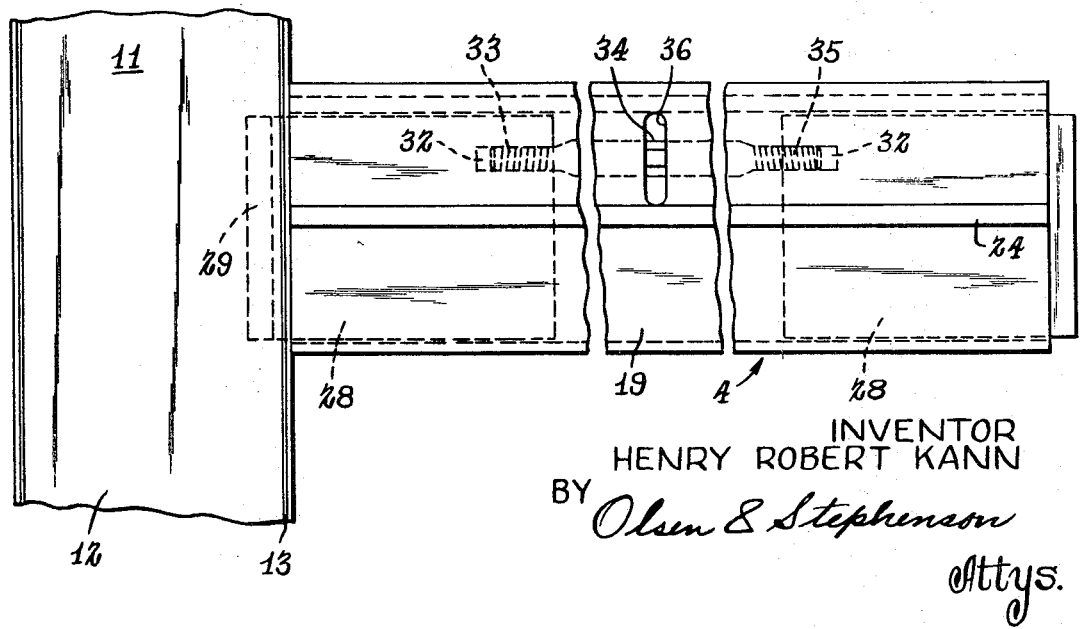

Oct. 20, 1970     H. R. KANN     3,534,517
STRUCTURAL SUPPORT ARRANGEMENT AND METHOD OF ASSEMBLING
Original Filed Oct. 21, 1965     11 Sheets-Sheet 3

INVENTOR
HENRY ROBERT KANN
BY Olsen & Stephenson
Attys.

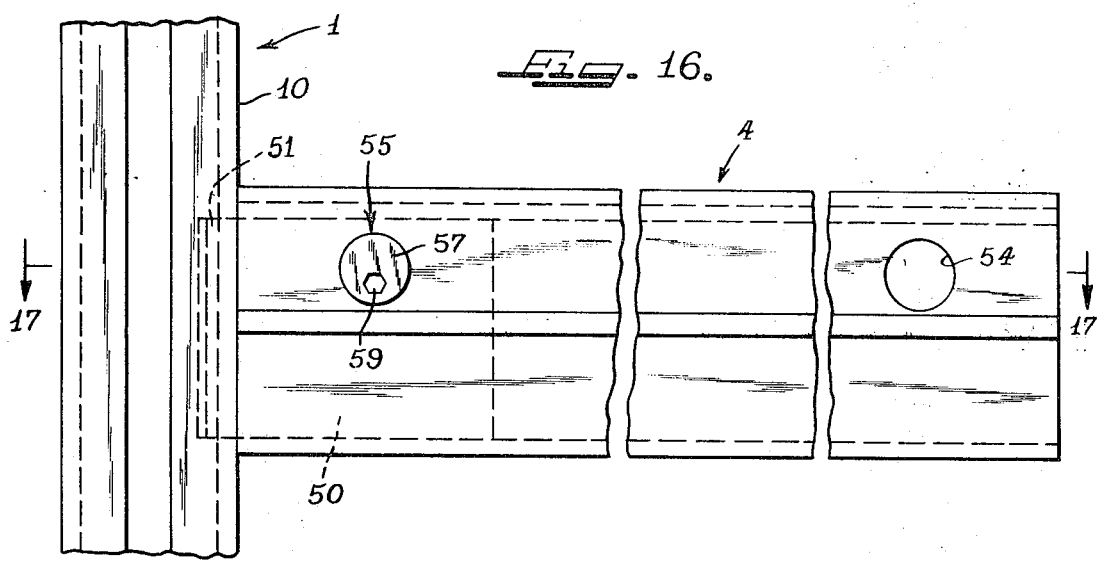
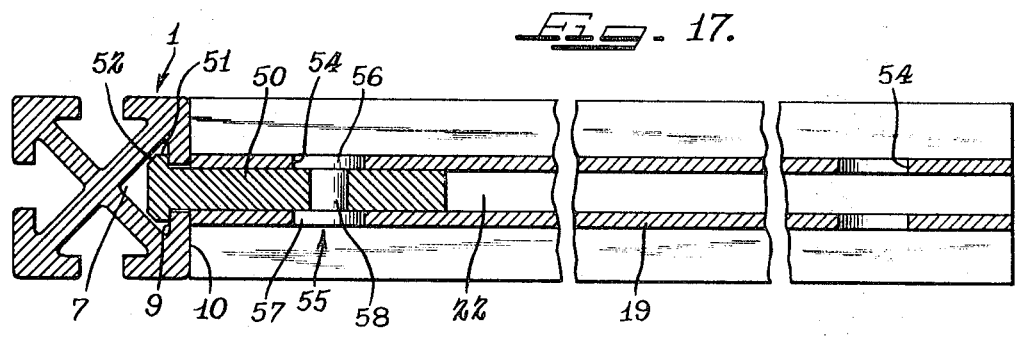
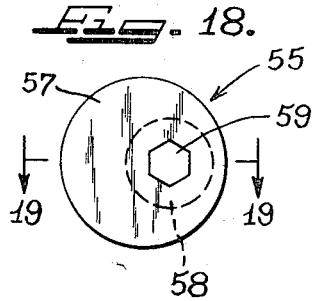
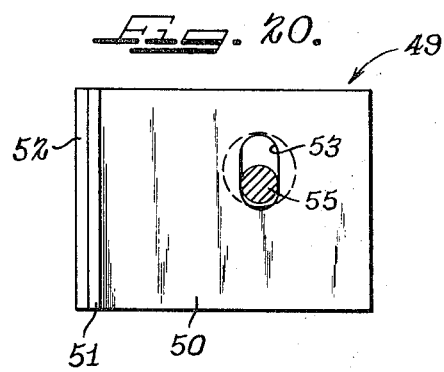

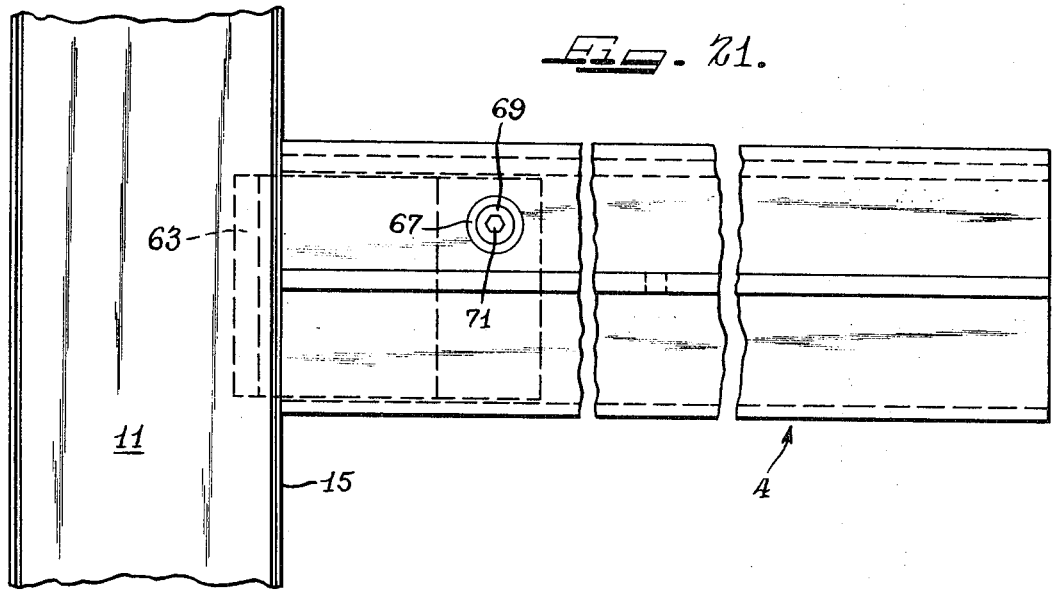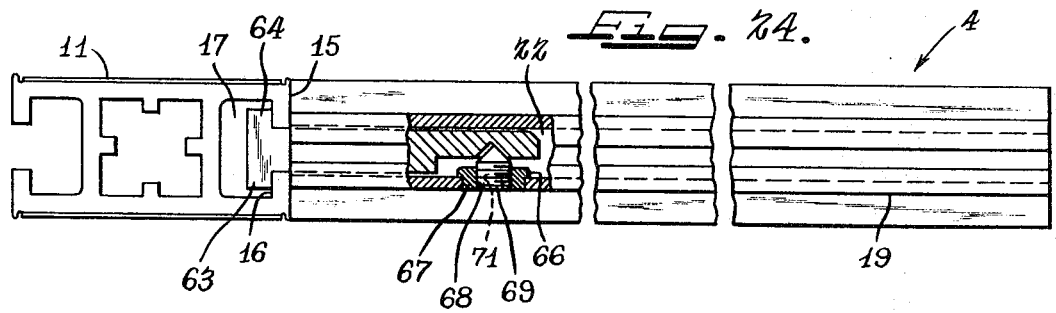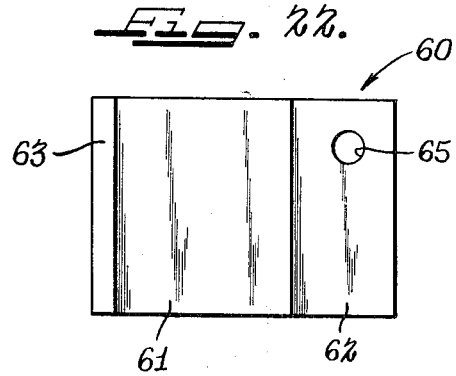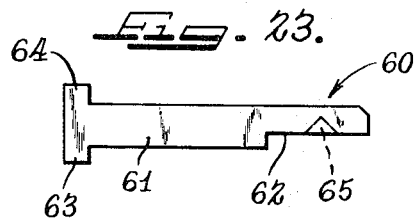

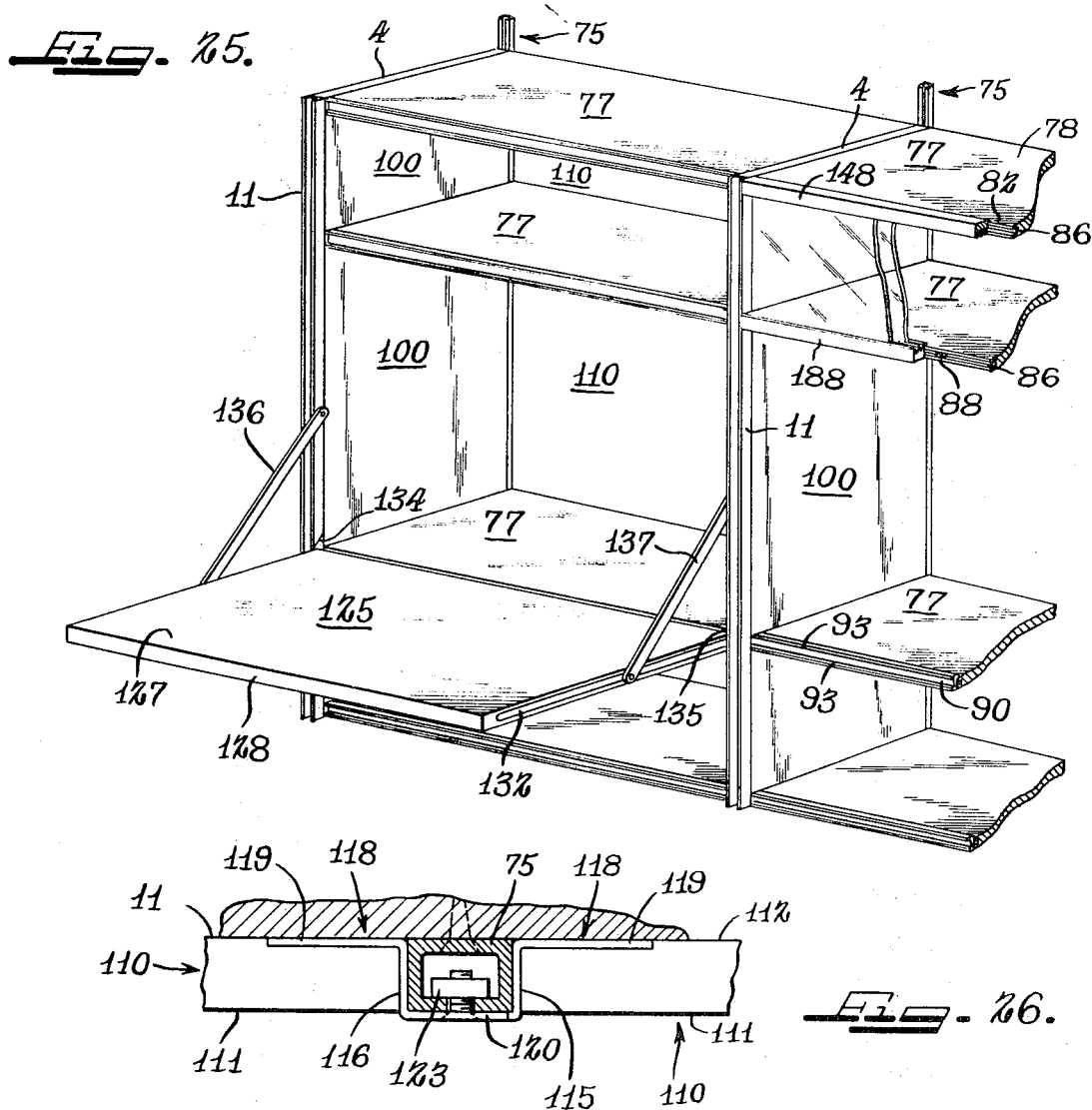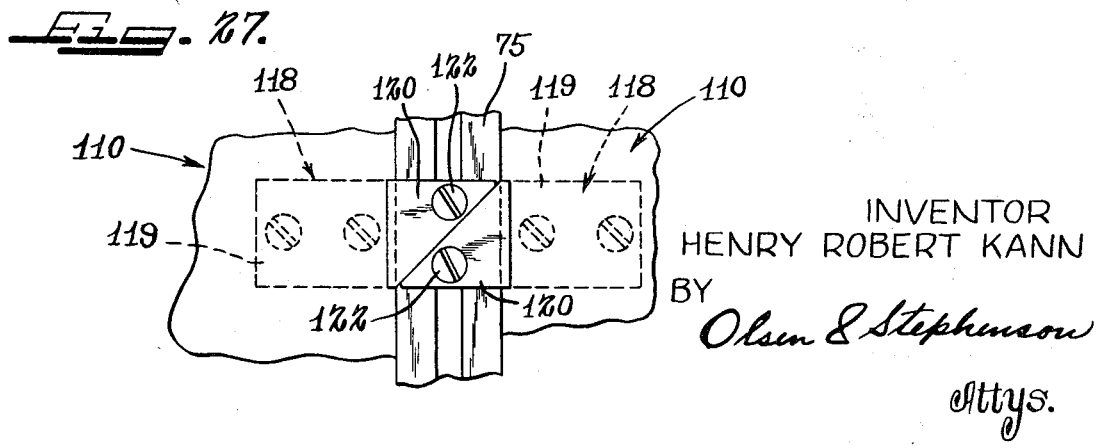

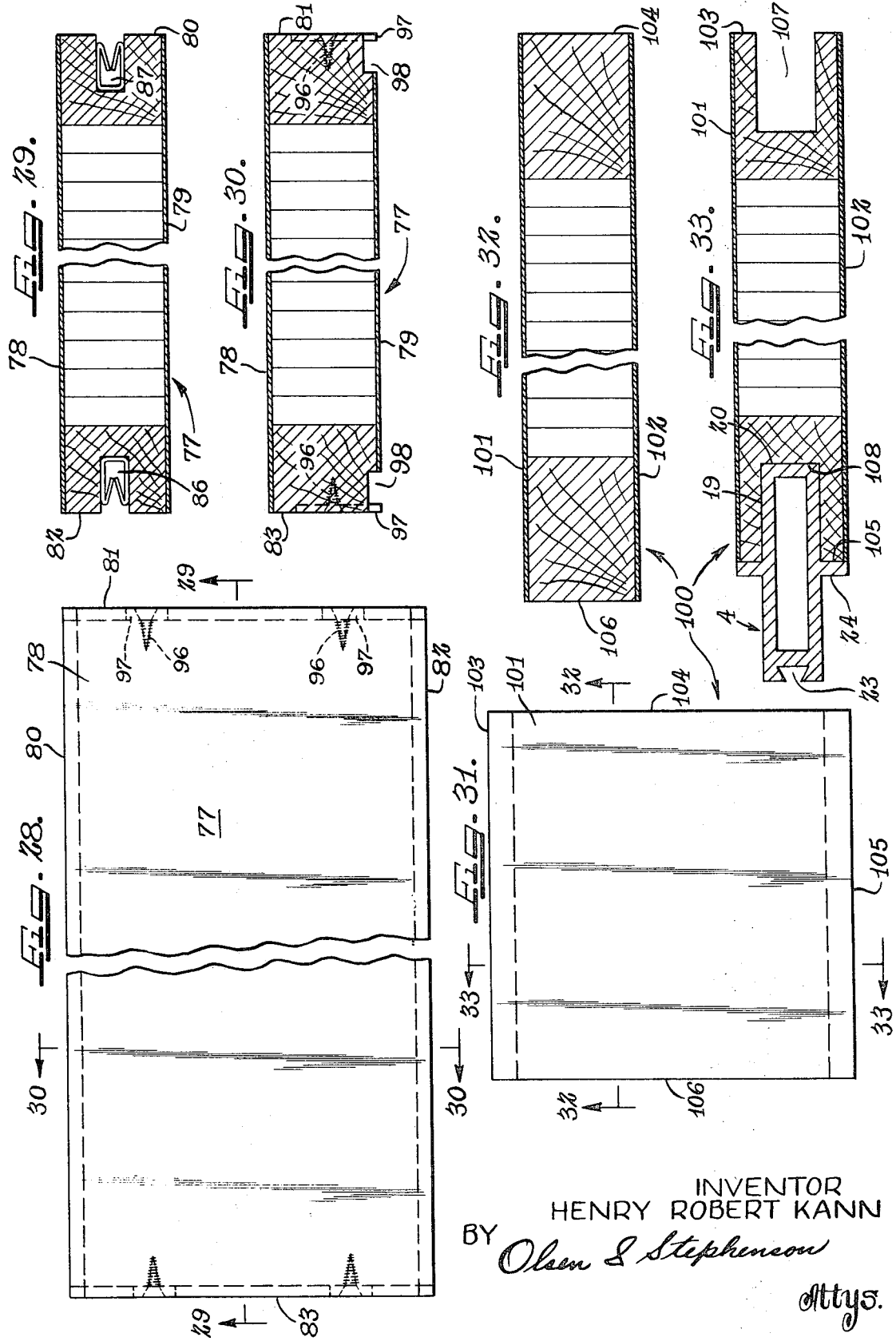

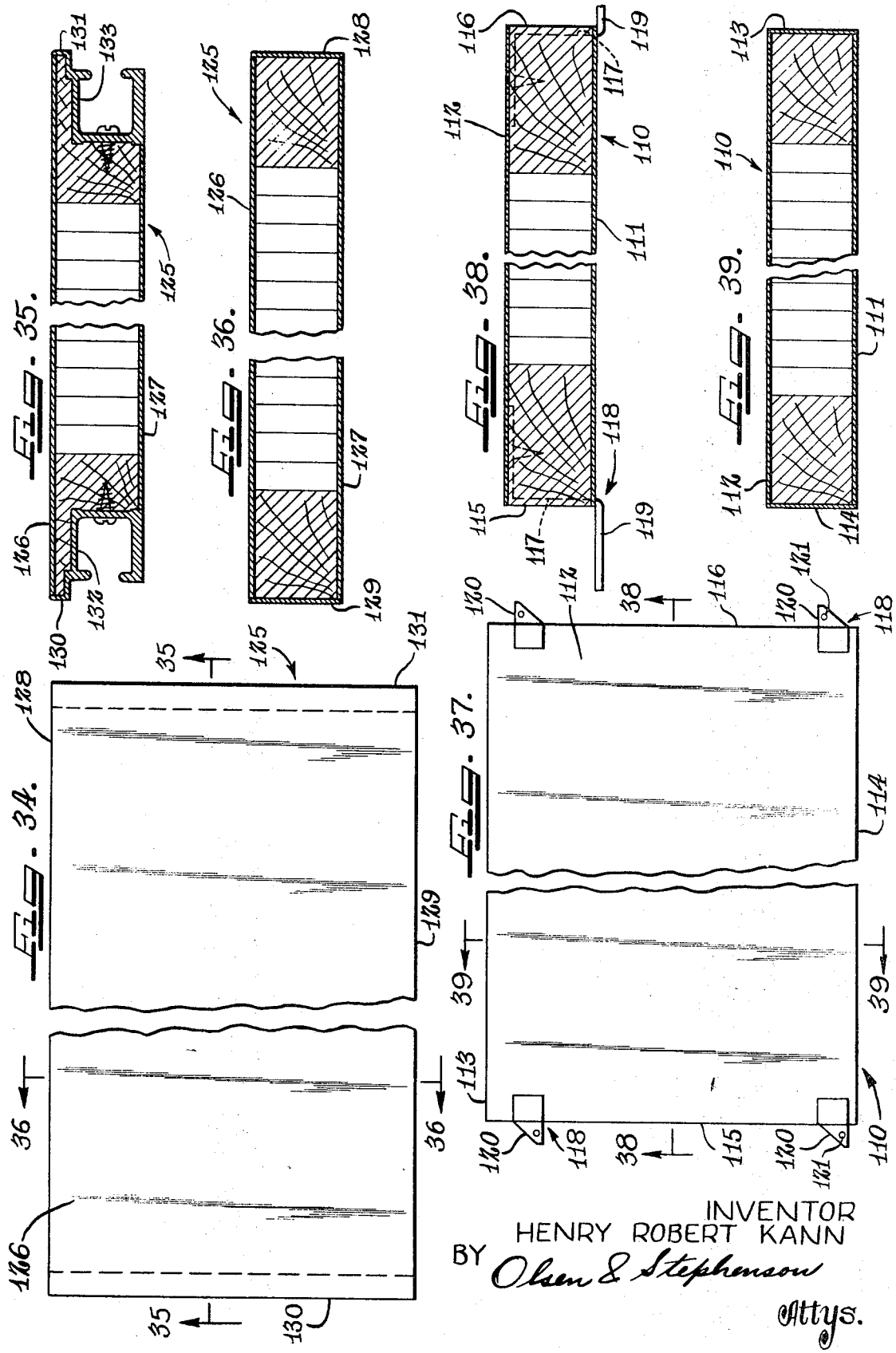

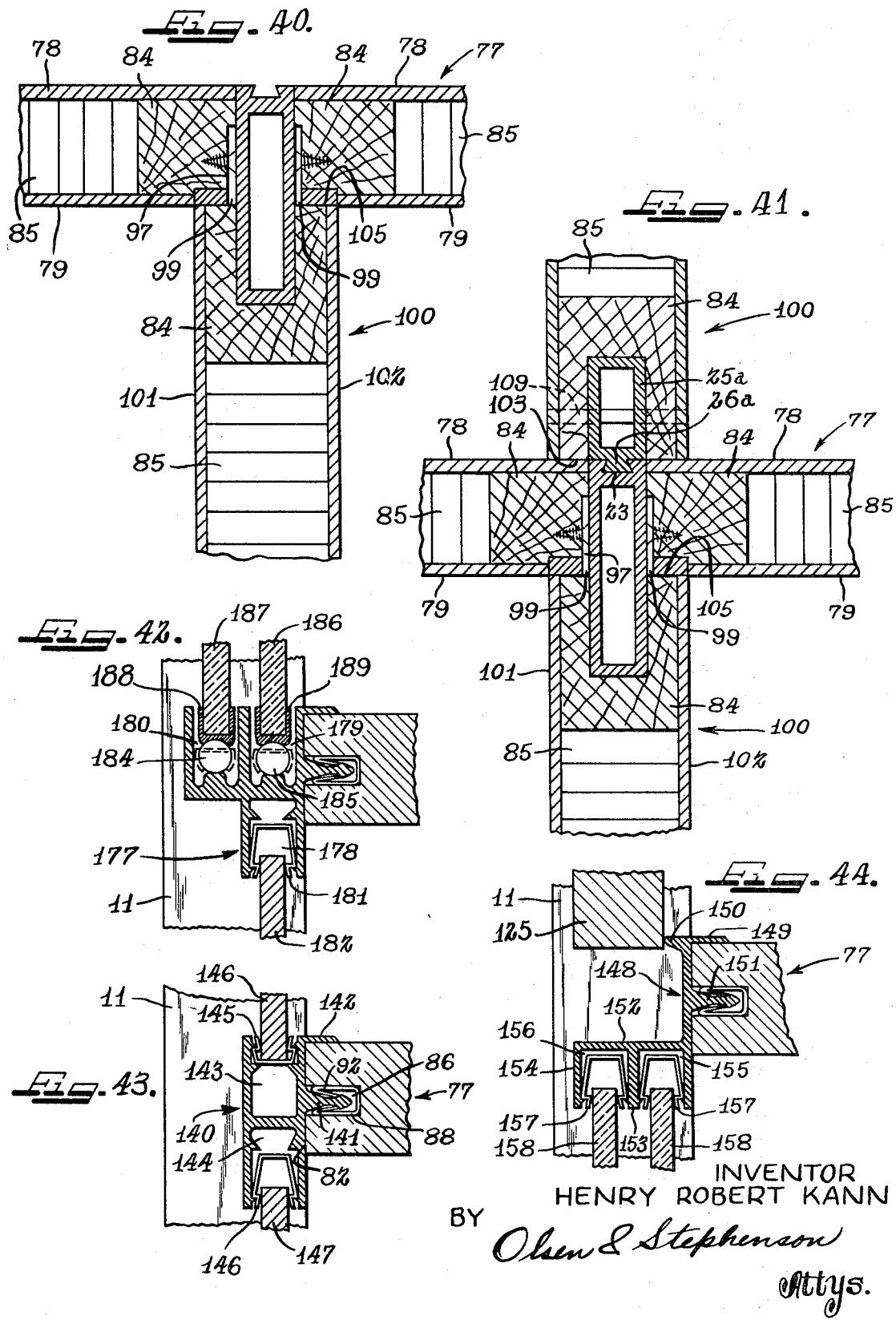

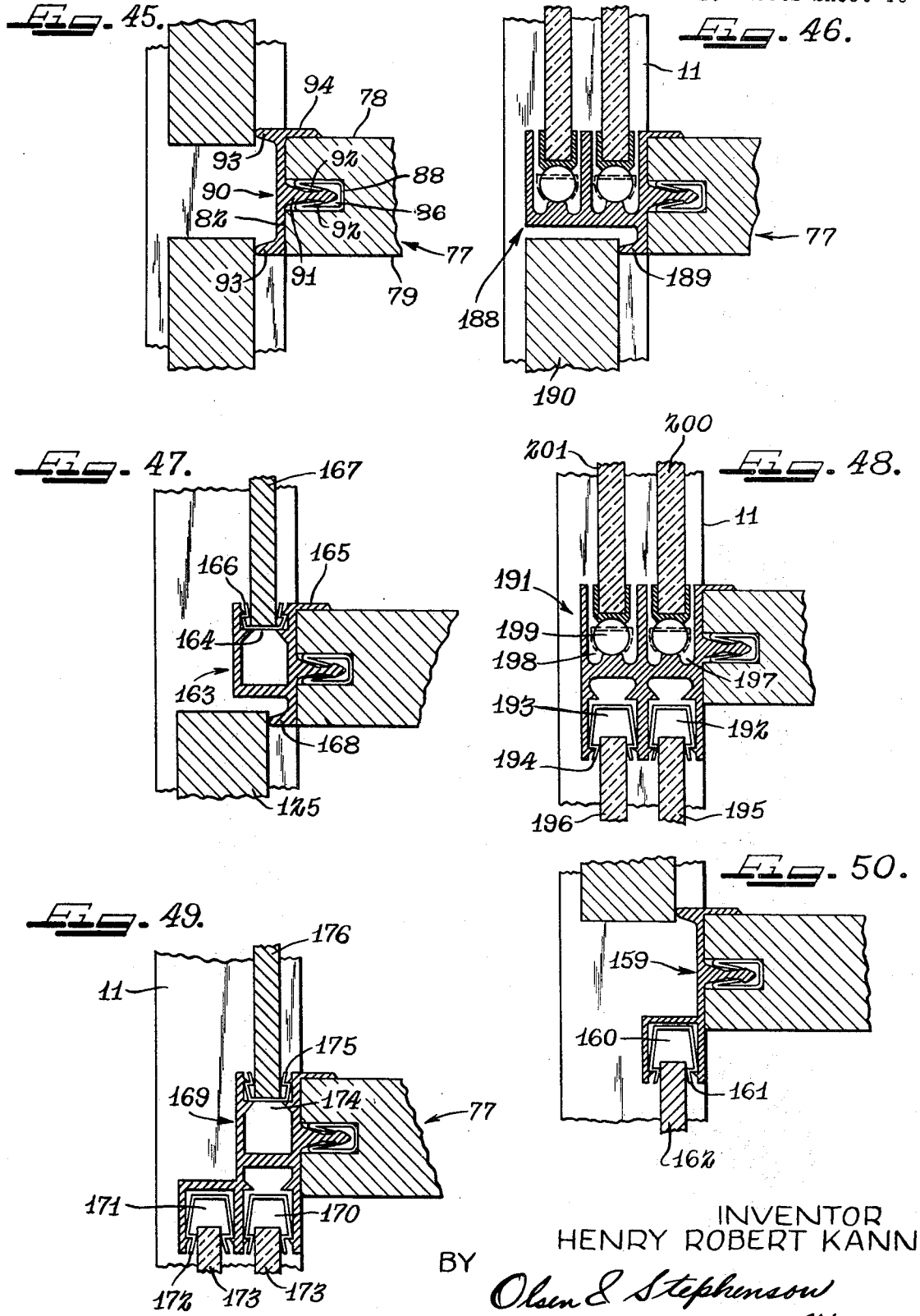

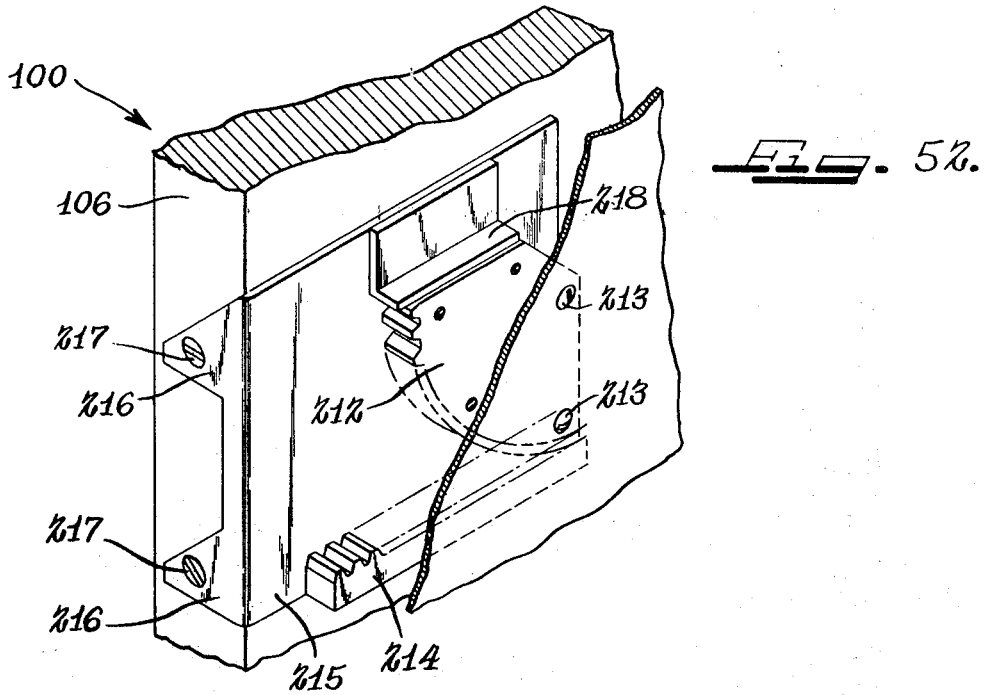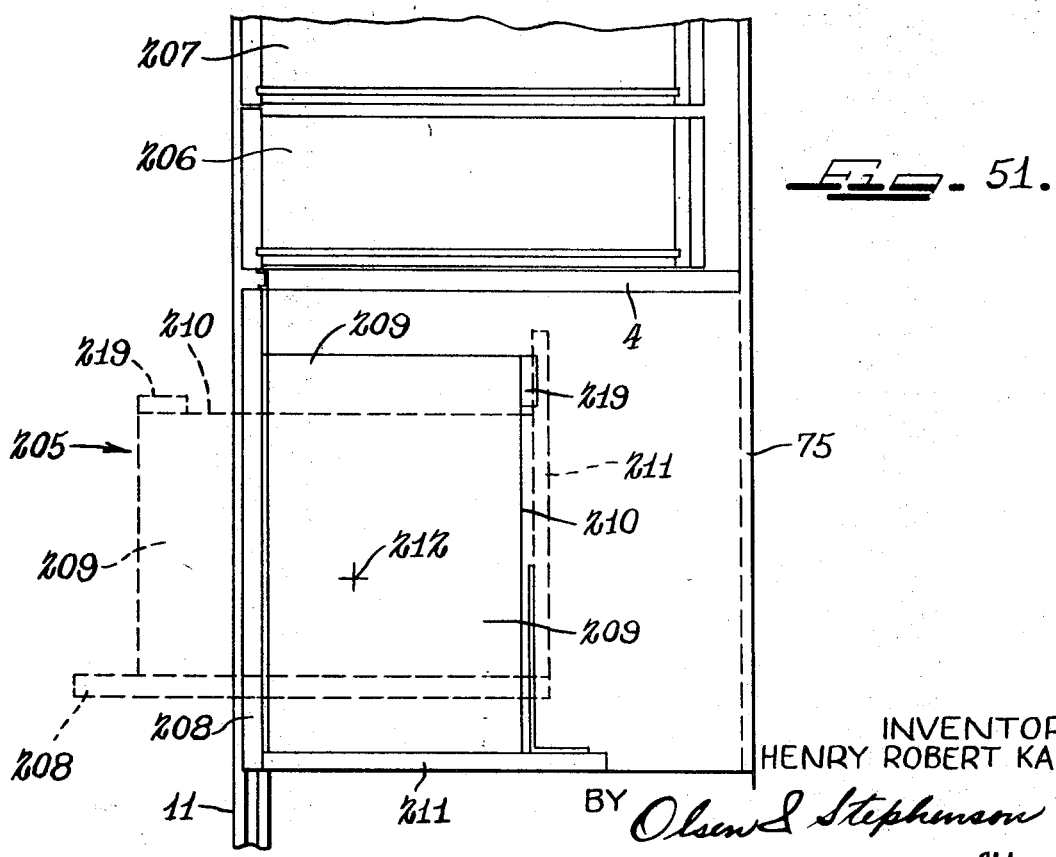

United States Patent Office 3,534,517
Patented Oct. 20, 1970

3,534,517
STRUCTURAL SUPPORT ARRANGEMENT AND METHOD OF ASSEMBLING
Henry Robert Kann, New York, N.Y., assignor, by mesne assignments, to Hoover Ball Bearing Company, Saline, Mich., a corporation of Delaware
Original application Oct. 21, 1965, Ser. No. 499,371, now Patent No. 3,458,052, dated July 29, 1969. Divided and this application June 3, 1968, Ser. No. 733,937
Int. Cl. E04h 1/12; A47f 5/10
U.S. Cl. 52—239
20 Claims

ABSTRACT OF THE DISCLOSURE

Apparatus utilizing combinations of interengaging poles, brackets and panels for furnishing or storage applications. The poles and brackets are formed with interlocking constructions permitting their assembly in a variety of structural arrangements for use in a multiplicity of different settings.

CROSS-REFERENCE TO RELATED APPLICATION

This application is a division of copending application Ser. No. 499,371, filed Oct. 21, 1965 now Pat. No. 3,458,052 in the name of Henry Robert Kann for "Structural Support Arrangement and Method of Assembling."

BACKGROUND OF THE INVENTION

Pole supported furnishings, in general, have been in use for a number of years. Such pole furnishings generally utilized a number of vertically supported poles for the base of the structure to be erected. A horizontal shelf or bracket member was ordinarily secured to these vertically mounted poles. The pole and the bracket structure formed the supporting skeleton or foundation for the structure being erected. Normally, preformed panels or cabinetry was then secured to the supoprting pole and bracket structure. In erecting such structures considerable time and effort was devoted to establishing the precise vertical alignment of each of the vertical support poles and to the secure connection and alignment of the horizontally extending brackets to the poles. Often, even after great care was taken to properly align and mount a bracket, the tolerances were such that the bracket remained loosely connected to the pole and did not maintain the desired horizontal alignment with respect to the vertical pole. Even where the manufacturing tolerances of the abutting surfaces or the poles and brackets were close, the weight of the panels or cabinetry connected to them was sufficient to distort the poles or brackets or both. Sometimes too, to develop a high degree of rigidity between the poles and the brackets a number of additional brackets were made to span more than one pole to produce a more solid load bearing base structure.

SUMMARY OF THE INVENTION

The present invention provides an improved supporting structure and means for connecting panels to this structure to achieve a desired composite construction. The brackets and poles of the invention are made in a manner such that it is necessary to vertically align only the first pole of a multi-pole construction. This is accomplished by forming the mating bracket and pole surfaces in a manner such that the pole surfaces are parallel to the longitudinal axis of the pole and are generally flat in nature while the bracket surfaces are formed generally perpendicular to the longitudinal axis of the bracket. Therefore, after establishing the vertical alignment of the first pole with respect to the pole mounting surfaces, a bracket is secured to the pole by connecting means and is thereby made to rest at a right angle with respect to the axis of the pole. A second pole can therefore be connected to the opposite end of the bracket and secured thereto. When this is done, the second pole, due to the construction of the mating surfaces of the poles and brackets, will also be vertically aligned. While the specification is directed primarily to vertically aligned brackets and poles, the scope of the invention includes other angular relationships formed in the same manner.

Panels may be secured to the supporting structure in both vertical and horizontal directions without displacement of the previously aligned poles. To assist in the assemblage of vertically depending panels and vertically ascending panels to the same bracket, an insert was developed as part of the invention for connection to the bracket. Specially designed panels can be made to serve as lift front and drop front panels and sliding drawer supports without substantial change. Horizontally supported panels can be produced having edges which can be readily adapted, using interchangeable insert tracks, to support vertically disposed sliding panels and vertically disposed fixed panels. Simple, inexpensive fixtures have been devised for use in conjunction with the poles, brackets and panels of the invention to provide a time and cost savings means for erecting partitions, cabinets, furniture, book cases, files, etc. and combinations thereof having sliding doors, drawers, drop fronts, lift fronts, tip-out drawers, etc. The dimensions of any of the parts of a particular construction can be varied to accommodate the needs of and requirements of any particular user.

Since the spacing and organization of the brackets with respect to each other and with respect to the poles is virtually infinite, it is possible, utilizing the elements of this invention, to produce a great variety of configurations and structures. The panels which are designed for use with the pole and bracket elements of the invention are equally versatile in being readily adaptable for use with any desired bracket and pole spacing.

The poles of the invention are designed to receive a locking member which is connected to the bracket in a manner such that the adjustment of the locking member acts to firmly secure the bracket to the pole in vertically aligned relationship with respect to the axis of the pole. The means developed for adjusting the locking member to secure the bracket to the pole have been designed for compactness, simplicity and reliability of operation. To reduce assembly time and the number of tools required, the number and complexity of operative locking member parts has been reduced to a minimum. The means devised for moving the locking member into locking engagement with the pole, when actuated, produces positive engagement with a complementing element on the pole and over a substantial contacting area to thereby produce a solid cantilevered structure.

Further, to promote an appealing assembled esthetic appearance, the locking member and adjusting means have been enclosed within the bracket and the pole. In this manner a minimum amount of space is required and extraneous protruding structures can be done away with to simplify the assembly of panels to the bracket structure.

Securement fixtures for attaching panels to pole, hinges to poles, panel lift and drop arms to panels and poles, and tip-out drawer pivot elements, etc, to poles have configurations which permit pairs of such fixtures or combinations of any of the fixtures to be mounted in side-by-side relationship on the same pole in the same vertical space. While the fixtures can be secured to a pole in mating alignment, they can be staggered along the length of a pole as required in a particular arrangement. Also, in certain structural arrangements, the fixtures may be secured to panels instead of to poles.

The tip-out drawer of the invention is balanced between poles of the support arrangement with a pivot offset advantage. This permits the opening and closing of the drawer under balanced load conditions with a minimum of exertion. The drawer rotates downwardly to open; and when open, the outermost end of the drawer projects beyond the plane of the poles for greater accessibility. When closed, the drawer is flush with the plane of the poles. By overbalancing the drawer it remains in a wholly open or wholly closed position in cooperation with pivot stop elements normally secured to poles of the structural arrangement.

The invention, therefore, provides a structural supporting unit, a structure and a method for erecting a structure. Poles of the invention can be free standing, wall mounted or secured to another structure. Poles are formed with at least one channel which ordinarily extends substantially the entire length of the pole. This channel communicates with the interior and exterior of the pole through a longitudinally extending slot which has a smaller transverse dimension than the corresponding transverse dimension of the channel. The bracket which is assembled to the pole has a movable locking member connected to at least one of its ends. This locking member is designed for insertion into the channel of the pole whereby upon adjustment of the locking member the bracket may be firmly anchored to the pole. The panels of the invention are designed for simple and expeditious connection to connecting means on the brackets and poles and provide vertical and horizontal walls, interchangeable drawers, lift and drop panels, sliding doors, and tip-out containers. The fixtures used to connect the panels to the poles are of complementing configurations and permit the securement of two such fixtures to a single pole in the same plane with a resultant reduction in vertical space mounting requirements.

Other objects of this invention will appear in the following description and appended claims, reference being had to the accompanying drawings, forming a part of this specification wherein like reference characters designate corresponding parts in the several views.

BRIEF DESCRIPTION OF THE DRAWINGS

FIG. 1 is a perspective view of a vertical pole-horizontal bracket structural support unit of the invention;

FIG. 2 is a cross section of the pole shown in FIG. 1;

FIG. 3 is a cross section of another embodiment of a pole of the invention;

FIG. 4 is a front elevation of the pole of FIG. 3;

FIG. 5 is a perspective view of a bracket with parts broken away;

FIG. 6 is a perspective view of a pair of panel supporting inserts for the bracket of FIG. 5;

FIG. 7 is a perspective view of a locking member which is insertable in the open end of a bracket;

FIG. 8 is a plan view of the locking member of FIG. 7;

FIG. 9 is a side elevation of the locking member of FIG. 7;

FIG. 10 is a top view showing one of the pole embodiments in cross section and a top view of a bracket connected to it;

FIG. 11 is a side elevation of a pole and bracket assembly illustrating an actuator for securing the locking member to a pole;

FIG. 16 is a side elevation of a pole and bracket assembly showing another embodiment of the locking member actuator;

FIG. 17 is a top sectional view of the assembly of FIG. 16 taken along lines 17—17;

FIG. 18 is a side elevation of the locking member actuator of FIGS. 16 and 17;

FIG. 19 is a sectional view of the operator of FIG. 18 taken along lines 19—19;

FIG. 20 is a side elevation of the locking member of FIGS. 16 and 17 with the actuator shown in operative relation;

FIG. 21 is a side elevation of a pole and bracket assembly illustrating another embodiment of the locking member and actuator;

FIG. 22 is a side elevation of the locking member of the assembly of FIG. 21;

FIG. 23 is a top view of the member of FIG. 22 illustrating the means for actuation in dotted lines;

FIG. 24 is a top view of the assembly of FIG. 21 with parts broken away illustrating the locking member and actuator in operative relation;

FIG. 25 is a perspective view of a structural support arrangement of the invention;

FIG. 26 is a partial top view of back panels connected to a pole and bracket assembly;

FIG. 27 is a front elevation of the back panel connection of FIG. 26;

FIG. 28 is a plan view of a horizontal panel of the invention;

FIG. 29 is a sectional view of the panel of FIG. 28 taken along lines 29—29 showing panel mounting clips;

FIG. 30 is a sectional view of the panel of FIG. 28 taken along lines 30—30 showing a mounting clip secured to the panel;

FIG. 31 is a plan view of a vertical panel of the invention;

FIG. 32 is a sectional view of the panel of FIG. 31 taken along lines 32—32;

FIG. 33 is a sectional view of the panel of FIG. 31 taken along lines 33—33 shown in mounted relationship with respect to a bracket;

FIG. 34 is a plan view of a lift or drop panel;

FIG. 35 is a sectional view taken along lines 35—35 illustrating the slide track of the panel of FIG. 34;

FIG. 36 is a sectional view of the panel of FIG. 34 taken along lines 36—36;

FIG. 37 is a plan view of a back panel;

FIG. 38 is a sectional view of the panel of FIG. 37 taken along lines 38—38 showing back panel clips assembled thereto;

FIG. 39 is a sectional view of the panel of FIG. 37 taken along lines 39—39;

FIG. 40 is a cross-sectional view illustrating a bracket supporting a pair of opposed horizontal panels and a vertical panel;

FIG. 41 is a cross-sectional view illustrating a bracket and bracket insert supporting pairs of opposed horizontal and vertical panels;

FIG. 42 is a partial sectional view illustrating a horizontal panel with an edge fixture connected thereto and showing a lower fixed and upper pair of sliding panels operative in the end fixture;

FIG. 43 is a view similar to FIG. 42 showing upper and lower panels connected to the end fixture;

FIG. 44 is a view similar to FIG. 42 showing a pair of lower panels connected to an end fixture;

FIG. 45 is a sectional view of an unsupported edge of a horizontal panel illustrating an end fixture secured thereto and upper and lower vertical panels abutting the end fixture;

FIG. 46 is a view similar to FIG. 45 showing a pair of vertically supported sliding panels slidably engaging an end fixture;

FIG. 47 is a view similar to FIG. 45 showing an upper vertically supported fixed panel in engagement with an end fixture;

FIG. 48 is a view similar to FIG. 46 showing an upper pair of sliding panels and a lower pair of sliding panels connected to an end fixture;

FIG. 49 is a view similar to FIG. 47 showing a lower pair of sliding panels and an upper fixed panel connected to an end fixture;

FIG. 50 is a view similar to FIG. 47 showing a lower fixed panel connected to an end fixture;

FIG. 51 is a partial side elevation of a structural arrangement of the invention illustrating a tip-out unit and a pair of vertically spaced sliding drawers; and FIG. 52 is a perspective view of the rack and gear arrangement employed to tip-out the unit of FIG. 51.

DESCRIPTION OF THE PREFERRED EMBODIMENTS

Figure 12:
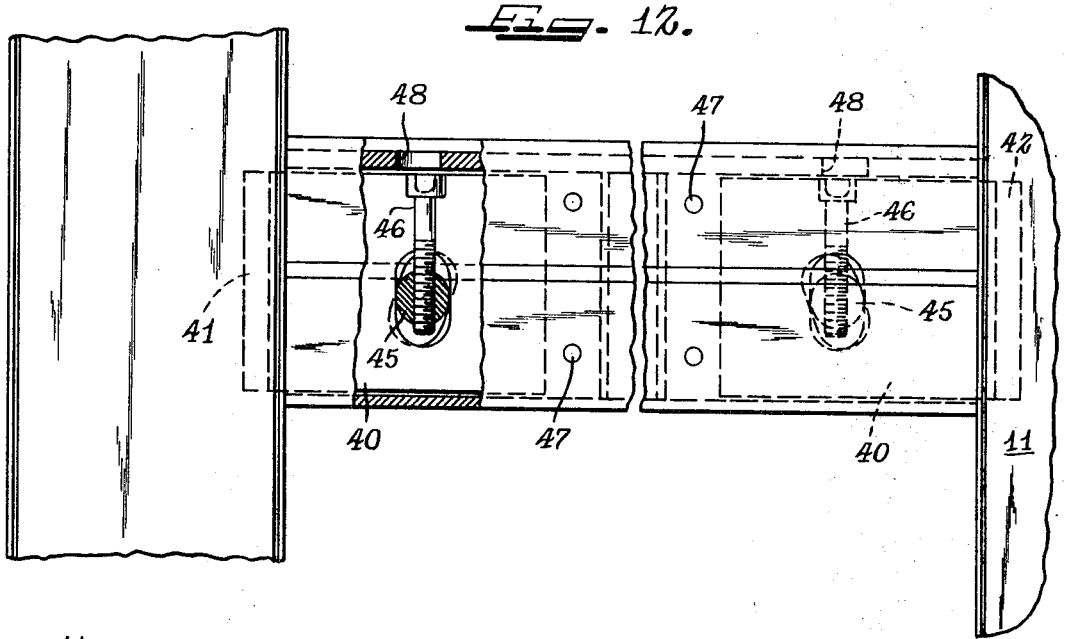
FIG. 12 is a side elevation of a double pole and single bracket assembly and another embodiment of the locking member actuator.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The basic structural support arrangement of the invention is shown in FIG. 1 of the drawings. A pair of poles, each designated 1, are supported upon suitable adjustable pedestals 2 such as those shown in the patent to R. Beal, No. 2,940,718 and Carl B. Hinrichs, No. 3,228,646. These pedestals may be either spring loaded or adjustable in a manner such that a spring loaded top adapter 3, also shown in the above references, may be put into firm engagement with a ceiling or other structure. In some applications of the arrangement of the invention it may be desirable to reverse the pedestal and the top adapter so that the adjustable device is at the top rather than at the bottom. In other applications pedestals and top adapters may not be used, and the pole may be mounted and secured to or supported solely by a wall. The supporting structure may be free standing in applications where more than a pair of poles is employed.

In normal installations, the first pole is vertically aligned and plumbed by suitable aligning and leveling means. Where such pole is installed between a ceiling and floor such as is shown in FIG. 1, the pedestal 2 is adjusted to firmly bias the spring loaded top adapter 3 into engagement with a ceiling and to maintain the pole in its vertically supported position. At this point, horizontal brackets 4 may be secured to the pole in a manner hereinafter to be more fully described; and, due to the unique construction of the pole and bracket arrangement, a second pole can be connected to the opposite bracket ends and when firmly secured thereto will also be positioned in plumb and parallel alignment with the first pole. The pedestal and top adapter of the second pole can then be adjusted to establish a firm mounting between the ceiling and the floor.

In the unit shown in FIG. 1, additional horizontal brackets can be connected to the poles to provide outstretching supporting structures.

The pole cross section shown in FIG. 2 comprises a generally X-shaped member 5. The ends of each of the legs of the X-shape 5 are provided with a pair of opposed flanges 6 which extend at about 45-degree angles to each of the respective legs. These flanges 6 are spaced from one another in a manner such that receiving chambers 7 are provided between each of the pair of legs of the X-shape. These receiving chambers 7 communicate with the exterior of the leg through slots 8 which have smaller transverse dimensions than the largest transverse dimension of the receiving chambers. The walls 9 of the receiving chambers opposite the outer surface flange walls 10 are positioned in parallel alignment with them to facilitate the firm connection of a bracket locking member to the pole.

A second embodiment of a pole of the invention is shown in FIGS. 3 and 4 and in the patent to Carl B. Hinrichs et al., No. 3,288,418. This second pole, generally designated 11, has a rectangular configuration in cross section. Opposed faces 12 are flat, as shown in FIG. 3, and are positioned in parallel alignment. The outermost ends of faces 12 are provided with longitudinally extending grooves 13 and slightly enlarged lip-like edges 14 which act, when a vinyl or other surfacing material is adhesively bonded to faces 12, to contain any excess adheive which may have accumulated during the bonding of the surfacing material to faces 12. Side walls 15 of the pole 11 cooperate with opposing walls 16, forming part of receiving chambers 17, through slot 18 to provide a means for connecting a bracket member to the pole as will be discussed subsequently.

A bracket 4 of the invention is illustrated in FIG. 5. As is shown, the cross section of bracket 4 is generally rectangular and includes parallel vertical side walls 19 connected by horizontal walls 20 and 21 which define a rectangular cavity 22 extending the length of the bracket and open at both ends thereof. The horizontal top wall 21 is formed with a dovetail 23 slot extending the full length of the bracket. A pair of opposed laterally extending flanges 24 project from each of the side walls 19 about half way between the top and bottom thereof and extend the length of the bracket. These flanges 24 serve both as panel supports, as will be discussed below, and as lateral bracket stiffeners. In the preferred methods of producing brackets, the entire bracket, as shown in FIG. 5, is formed as a one-piece aluminum extrusion.

Bracket inserts 25, shown in FIG. 6, are fabricated from spring steel having a generally rectangular configuration as shown. The bottom dovetail portion 26 is provided with an axial slot which extends the length of the insert and establishes communication with the chamber defined by the walls of the insert. Opposing walls of the insert may then be compressed and dovetail portion 26 inserted into the generally complementing slot 23 of the bracket. The resilient response of the spring steel insert 25 in slot 23 acts to maintain the insert in a predetermined axial position on the bracket 4. An alternate embodiment of the bracket insert is shown in FIG. 41. The alternate insert 25a is formed from aluminum and is extruded to the generally rectangular configuration shown. Each of the inserts 25a is formed with a dovetail 26a complementing and insertable in the slots 23 of a bracket 4. The vertical panel support function of these inserts 25 and 25a will be more fully described subsequently.

Irrespective of which insert is used, the bracket or first member 4 forms with the insert or second member 25, 25a an interlocked two-piece bracket whose dimensions have been vertically extended beyond those of the one-piece bracket 4. Thus, either the first member 4 considered by itself or the combination of the first member 4 interlocked with one of the second members 25, 25a provides a structure which may be described as a bracket.

FIGS. 10 and 11 illustrate a bracket 4, as shown in FIG. 5, secured to a pole 11 of the type shown in FIG. 3 although in most instances poles 1 and 11 can be interchanged. The means for securing the bracket 4 to the pole 11 comprises a vertically elongated T-shaped locking member which is generally designated 27. The locking member is inserted into cavity 22 at an end of the bracket. The locking member 27 is shown in FIGS. 7, 8 and 9 to have an elongated body 28 with opposed flanges 29 and 30 at one of its ends to provide the generally T-shaped configuration of the member. The innermost surface 31 of locking member 27 is provided with a threaded opening 32 into which the threaded end 33 of locking member actuator 34 is threaded. As is shown in FIG. 11, locking member actuator 34 is provided with a pair of threaded ends 33 and 35 each of which is threaded into the end of a locking member 27 positioned at opposite ends of bracket 4. The actuator 34 can, therefore, be rotated by a tool, such as a small wrench, which is inserted into either of the slots 36 provided in side walls 19 of bracket 4 and into engagement with a hexagonal portion of actuator 34. The rotation of actuator 34 shown in FIG. 11 will, therefore, simultaneously retract the flanges 29 and 30 of the bodies 28 of locking members 27 toward the ends of bracket 4 or will cause the extension of the flanges 29 and 30 from the bracket extremities.

In the normal attachment of a bracket 4 to a pole, the locking member actuator 34 is set in a position placing flanges 29 and 30 in their extended position. The flanges 29 and 30 are then inserted, from either the top or bottom of pole 11, into receiving chambers 17 of the pole. The bracket 4 and locking member 27 may be moved upwardly or downwardly on the pole utilizing receiving chamber 17 and slot 18 as a track and may be aligned on the pole in an infinite number of positions.

In some applications, however, it may be desired to insert the bracket from a position intermediate the extremities of the pole. In such an application the pole slots 18 in a predetermined area of the pole are enlarged (not shown) both laterally and vertically to a dimension large enough to permit insertion of the flange portions 29 and 30 of locking member 27 into receiving chamber 17. Once inserted, the locking member can be moved either upwardly or downwardly on the pole from the point of slot enlargement and secured to the pole in a desired position.

When the bracket 4, as shown in FIGS. 10 and 11, has been moved to its desired vertical position on the pole 11, the locking member actuator is rotated by a wrench or other suitable tool inserted through slot 36 and into engagement with the hexagonal portion of the actuator. The rotation produces the retraction of locking member 27 and brings the inner surfaces of flanges 29 and 30 into surface-to-surface engagement with walls 16 and the end surfaces of bracket 4 into opposing surface-to-surface engagement with side walls 15 of pole 11 or the walls 9 and 10 (shown in FIG. 2) where a pole 1 is employed. In describing the attachment of brackets 4 to pole 11 it is understood that the procedures described apply equally to pole 1.

Since the height of the locking member 27 almost equals that of bracket 4, a surface-to-surface engagement of substantial area is produced between the locking member, pole and bracket in the connection of the bracket to the pole in the manner described above. Such substantial area engagement results in a very rigid high-strength bracket attachment which will not readily become loose due to prolonged use. Further, the width of body 28 of locking member is ordinarily maintained close to that of either of the slots 7 or 18 of poles 1 and 11, respectively. The rigidly attached bracket due to its substantial load bearing surface is thereby effectively prevented from deflecting vertically or horizontally with respect to its initial attachment position.

By employing ordinary machining and extrusion techniques in the production of the structural elements, the engaging bracket, pole and locking member surfaces will, in the preferred embodiment, assume a vertical relationship with respect to each. However, other bracket and pole angular relationships can be produced, as desired, utilizing conventional machining and extrusion techniques.

Since the bracket can be relied upon to establish a vertical relationship with a pole when attached, only one pole need be leveled and plumbed in a multi-pole, multi-bracket installation. Each element of such an installation, when installed, will automatically establish a vertical relationship with respect to the element or elements to which it is connected obviating additional time-consuming and costly leveling operations.

While the embodiment in FIGS. 10 and 11 shows an actuator 34 connected between a pair of opposed locking members 27 which can be actuated to simultaneously connect a pair of poles to a single bracket, the bracket could be readily modified to provide a pair of independently operable actuators or a single actuator for one end of the bracket. These modifications would depend upon the end use of the bracket, e.g. a free-standing horizontal supporting bracket or a bracket joining a pair of poles, both as shown in FIG. 1.

Figure 13:
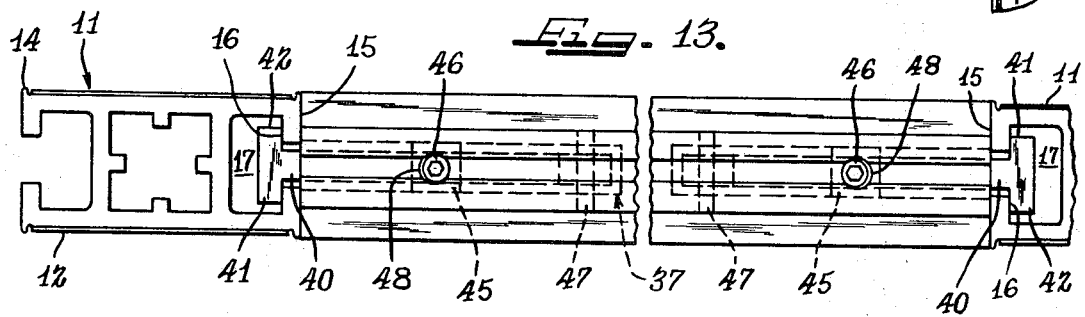
FIG. 13 is a top view of the assembly of FIG. 12.
Figure 14:
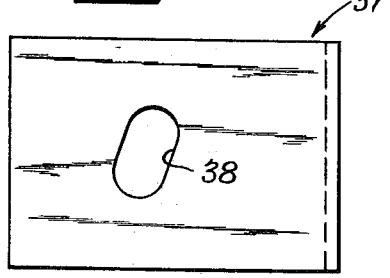
FIG. 14 is a side elevation of the yoke portion of the locking member actuator shown in FIGS. 12 and 13.

A second bracket attachment construction is illustrated in FIGS. 12–15. The basic pole and bracket assembly shown is substantially identical to that of the previous embodiment and where applicable the same reference numbers are used. As can be seen from FIGS. 13 and 14, a yoke or U-shaped member, generally designated 37, is formed with a pair of oblong slots 38, one in each of the opposed legs of the yoke 37 and in alignment with each other. As shown in FIG. 14, the oblong slot 38 has a longitudinal axis aligned at an oblique angle with respect to the longitudinal axis of the yoke.

Figure 15:
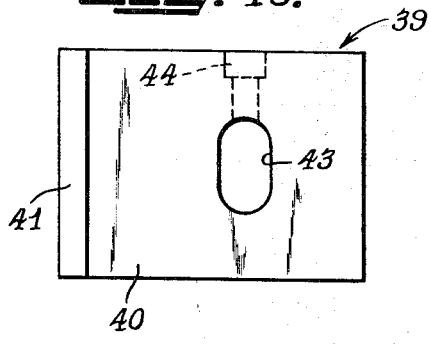
FIG. 15 is a side elevation of the locking member of FIGS. 12 and 13.

A locking member 39, similar in overall configuration to locking member 27, is formed with a body portion 40 and opposed flanges 41 and 42 projecting laterally therefrom. The body portion 40 of member 39, as shown in FIG. 15, is provided with an opening 43 of generally oblong configuration having a longitudinal axis in generally normal relationship to the longitudinal axis of the locking member. Opening 43 extends laterally and completely through body portion 40. A counter-bored passage 44 (shown in FIG. 15) is provided in the upper surface of the body 40 and communicates with opening 43.

The body 40 of the locking member 39 is inserted between the opposed legs of yoke 37. When inserted the opening 43 in body 40 is in partial register with the aligned slots 38 in the opposed legs of yoke 37. A cylinder 45 is inserted into the opening provided by the alignment of body 40 with yoke 37 and is supported by the legs of the yoke and body 40 bordering the opening. While a cylinder is shown in the preferred embodiment, a number of configurations would suffice. A bolt 46 is inserted into counter-bore 44 and threaded into cylinder 45. The bolt has a head adapted to be turned by an Allen wrench although other operative head configurations could be adopted. When bolt 46 is rotated in one direction, the cylinder 45 into which it is threaded is moved upwardly. This upward movement of cylinder 45 due to the oblique angular relationship of the slots 38 in the opposed legs of the yoke 37, also produces a cylinder movement from left to right, as can be seen in FIG. 14. Since cylinder 45 spans slots 38 and passes through opening 43 of locking member 39, the locking member is also moved from left to right by the bolt induced movement of the cylinder. Movement in the opposite direction is produced by reversing the rotation of bolt 46.

The yoke 37, locking member 39, cylinder 45 and bolt 46 assemblage is inserted as a unit into an open end of cavity 22. As shown in FIGS. 12 and 13, one unit is inserted into each of the bracket ends with the outermost edges thereof in alignment with the end surfaces of bracket 4. The yoke members 37 and thereby the units formed by the assemblage of parts are secured within the respective ends of cavity 22 by pins or rivets 47 anchored in side walls 19. An opening 48 is provided in top wall of bracket 4 to expose bolt 46 for operation through dovetail slot 23.

With the cylinder 45 in its lowermost position and thereby locking member 39 in its extended position with respect to the bracket, flanges 41 and 42 are inserted into receiving chamber 17 of pole 11 and the bracket is moved to its desired position on the pole. As shown in FIGS. 10 and 11, the bracket is simultaneously connected to a pair of poles 11. When the bracket has been aligned between the poles, bolts 46 are rotated utilizing an Allen wrench or other suitable tool inserted into top wall opening 48 of the bracket. As bolts 46 are rotated in counter-bore 44 of locking member body 40, cylinders 45, spanning body openings 43 and slots 38 of yokes 37 and into which the bolts are threaded, are raised in a generally vertical direction with respect to the longitudinal axis of the bracket. As cylinders 46 are raised, they are deflected inwardly of the yoke by the angularly disposed slots 38, shown in FIG. 14. The portions of cylinders 46 extending through the generally vertical openings 43 of the locking member 39 act against the surfaces bordering openings 46 and move locking member 39 inwardly of the yoke 37. As locking member 39 is moved inwardly, flanges 41 and 42 of the locking member are brought into engagement with walls 16 of poles 11. The bracket surfaces opposite the flanges act in conjunction with the flanges and in response to the rotation of bolts 46 and movement of cylinders 45 to produce a compressive engagement of the pole walls 15 and 16 between bracket 4 and locking members 39. This connection of bracket and poles, as in the case with the previous embodiment, produces a rigid and angularly aligned construction having high load bearing characteristics with a minimum of problems due to deflection when subjected to such loads.

A third bracket attachment construction is shown in FIGS. 16 through 20. In this embodiment pole 1, as shown in FIG. 2, is used as the supporting structure for the attachment of a bracket 4, although poles 1 and 11 can generally be interchanged in the embodiment of the invention. As is shown in FIGS. 17 and 20, the locking member 49 is similar in most respects to those of the previous embodiments. It comprises a body portion 50 and opposed flanges 51. In this instance, however, the front faces of the flanges are chamfered at 52 to conform to the configuration of receiving chamber 7 of the pole.

The body portion 50 of the locking member is inserted into cavity 22 of the bracket 4. The body 50 of the locking member is provided with an elongated slot 53 which extends generally vertically with respect to the longitudinal axis of the body. When the locking member 49 is inserted into the cavity 22 of the bracket, slot 53 is brought into register with circular openings 54 in the side walls 19 of the bracket. These circular openings are located in registry with each other on opposed surfaces of the bracket as shown in FIG. 17.

After the slot 53 and circular openings 54 have been aligned, a cam 55, as is shown in FIGS. 18 and 19 to be formed of a pair of plate-like circular end faces 56 and 57 connected by an eccentrically positioned cylinder 58, is connected to the bracket and locking member 49. This is done by separating end plate 57 from eccentric cylinder 58 and inserting the cylinder 58 and attached end plate 56 into the circular opening 54 in bracket 4 in a manner such that end plate 56 is flush with the outer surface side-wall 19 of bracket 4, as shown in FIG. 17, and cylinder 58 projects into slot 53 and through it into the circular opening 54 on the opposite surface of the bracket. Plate 57 is then secured to the projecting end surface of cylinder 58 as is shown in FIG. 19. The end surfaces of cam 55 are formed with hexagonal holes 59 which are adapted to receive an Allen wrench or other suitable rotating tool.

When cam 55 has been assembled to the bracket 4 and the body portion 50 of locking member 40, end plates 56 and 57 lie securely but rotatably in circular openings 54 of the bracket. The eccentric cylinder 58 is positioned in contact with surfaces of slot 53. To operate the locking member 49, an Allen wrench is inserted into one of the openings 59 of the cam which is then rotated in either a clockwise or counterclockwise direction. As the cam 55 is rotated, the eccentric cylinder 58 is rotated and being in constant contact with the surfaces of slot 53 serves to move the locking member 49 inwardly and outwardly with respect to the end surface of the bracket 4. For example, the cam as shown in FIGS. 18 and 19 has the eccentric cylinder 58 positioned in the three o'clock position and thereby would urge the locking member 49 into its most retracted position. In FIGS. 16 and 17, the eccentric cylinder is shown in a downward or six o'clock position. In this position the locking member is made to assume an intermediate position between fully retracted and fully extended. When the cam 55 is rotated to the nine o'clock position (not shown) the locking member 49 against which the eccentric cylinder 58 is urged is placed in its most extended position with respect to the end surface of bracket 4.

The assembly of a bracket 4 carrying a locking member 49 to a pole 1 is accomplished in much the same manner as in the previous embodiments. In this instance, cam 55 is rotated to place the locking member 49 in its extended position. When the locking member has been placed in its extended position, the opposed flange portions 51 are inserted into receiving chamber 7 of the pole and the bracket is moved to its desired vertical position on the pole. When the pole and bracket position has been established, an Allen wrench is inserted into hole 59 and the cam is rotated toward the three o'clock position to retract the flanges 51 and to produce the rigid engagement of the flanges 51 with receiving chamber walls 9 and the end surfaces of the bracket 4 with the outer flange walls 10 of pole 1. This therefore produces a rigid compressive engagement of the pole between the locking member flanges and the bracket end surfaces.

FIGS. 21 through 24 illustrate an additional construction for attaching a bracket 4 to a pole 11. In this embodiment the locking member 60 shown specifically in FIGS. 22 and 23 is formed with a generally T-shaped cross section as is seen in FIG. 23. The body portion 61 is provided with a recess 62 at an end thereof. At the opposite end of body 61 opposed flanges 63 and 64 similar in most respects to those of the previous embodiments are provided. The recessed portion of the body 61 is formed with an inwardly directed conical aperture 65.

As was the case with the previously described constructions, the locking member 60 is inserted into cavity 22 of bracket 4. The opposed flanges 63 and 64 project from the end of the bracket into which the locking member 60 has been inserted. The conical aperture 65 provided in recess portion 62 of body 61 is, upon insertion into cavity 22, aligned with a circular opening 66 bored through side wall 19 of the bracket 4. A cylindrical member 67 is threaded into side wall opening 66. Cylindrical member 67 is formed with an axial bore 68 which is threaded to receive a screw 69. Screw 69 is formed with a conical head 70 complementing the conical aperture 65 of the locking member 60. The opposite end of screw 68 is provided with a hexagonal hole 71 into which a rotating tool such as an Allen wrench can be inserted and operated.

To install the bracket on the pole, screw 69 in cylindrical member 67 is rotated until conical head 70 is partially withdrawn from the cavity 22 of the bracket. This acts to release locking member 60 and to permit the extension of opposed flanges 63 and 64 in distance from the extremity of the bracket. Flanges 63 and 64 are then inserted into receiving chamber 17 of pole 11 which acts in combination with slot 18 as a slide track for the locking member 60. The bracket and locking member are moved to a desired vertical position on the pole.

After the bracket has been suitably positioned on the pole, screw 69 is rotated in threaded bore 68 and into cavity 22 of the bracket. Screw 69 enters the cavity 22 in the area of the recessed portion 62 of locking member 60 and in alignment with at least a portion of conical aperture 65 therein. As the conical head 70 of the screw engages the conical surface of aperture 65 in the manner shown in FIG. 24, the body portion 61 of locking member 60 is moved inwardly relative to the end of the bracket from which the locking member projects. This is accomplished as the conical head of screw 69 is urged against the innermost surface defining aperture 65. The mechanical retraction of the locking member produces a compressive engagement of pole surfaces 15 and 16 between the bracket extremity and the innermost surfaces of flanges 63 and 64 with a resulting rigid pole and bracket assembly. By reversing the rotation of screw 69, the compressive engagement of the pole by the bracket can be released.

FIG. 25 illustrates one of the many possible installations of panels on a pole and bracket support frame.

While FIG. 25 illustrates a wall mounted version of the support arrangement of the invention it is understood that the installation could be free-standing utilizing another type of pole, supported between a floor and ceiling as shown in FIG. 1, or secured to another structure. Further, the panel arrangements of the adjacent poles can be widely varied both vertically and horizontally and need not be aligned as shown.

This installation utilizes a third pole embodiment, generally designated 75 and shown in cross section in FIG. 26. This pole is adapted to be mounted vertically upon a wall and in parallel predetermined spaced relationship with a second pole. Pole 75 is similar in most respects to pole 11 except that it is only about one-half as wide and one of the bracket receiving chambers has been eliminated and replaced by a transverse wall 76. A number of brackets 4 are secured to poles 75, as shown in FIG. 25, and extend horizontally therefrom. The extended ends of brackets 4 are secured to poles 11, although they could be secured to a pole 11, as in FIG. 26, or another pole 75 where required in particular applications. The means employed for securing the brackets 4 to the poles 75 and 11 can be any of the bracket securement constructions discussed above or any combination of such constructions.

Since the poles 75, in this instance, are wall mounted in a predetermined aligned relationship, the poles 11 need not be supported or aligned. As described above, the securement of the brackets 4 between poles 75 and 11 automatically establishes the desired positional and supporting relationship of each of the elements of the panel supporting frame.

As is shown in FIGS. 25, 40 and 41, horizontal panels, generally designated 77, are supported between brackets 4 upon bracket flanges 24. While adjacent horizontal panels shown in FIG. 25 are horizontally aligned, they may be aligned in staggered relationship as required by particular applications.

The construction of horizontal panels 77 is illustrated in greater detail in FIGS. 28, 29 and 30 and the mode of securement between the brackets which can be accomplished without misplacing the poles is shown in FIGS. 40 and 41. Horizontal panel 77 is fabricated with a rectangular configuration having top and bottom horizontal surfaces 78 and 79 connected by vertical surfaces 80, 81, 82 and 83. As is shown in FIGS. 40 and 41, horizontal panels 77, as well as the other panels of the arrangement of the invention utilize a composite laminated construction, although wood, metal, plastic or combinations of these materials can be employed in fabricating any of the panels. Top and bottom surfaces 78 and 79 are fabricated from a veneer which may be finished as is, painted, covered with high pressure laminates, or textured vinyl sheeting. The edge portions 84 defining the vertical surface portions 80, 81, 82 and 83 sandwiched between top and bottom surfaces 78 and 79 are preferably made of wood, although metal, plastic or other common wood substitutes may be used. The core portion 85 enclosed by edge portions 84 and sandwiched between top and bottom surfaces 78 and 79 consists of a sturdy lightweight honeycomb which may be fabricated from a plastic, cardboard, metal or other lightweight construction material.

Due to the composite laminated construction of horizontal panel 77, a relatively rigid lightweight panel having comparatively high-load bearing characteristics is produced. Edge portions 84 defining vertical surfaces 80 and 82 of panel 77 are routed midway between top and bottom surfaces 78 and 79 to provide longitudinally extending recesses 86 and 87. Spring clips 88 and 89 are secured within the recesses 86 and 87; and as shown in FIGS. 25 and 45, a trim strip, generally designated 90, formed from a metal, plastic or rubber extrusion, is secured along the vertical surfaces 80 and 82 of the panel by studs 91 which project laterally from the trim strip and into compressive engagement with inclined surfaces 92 of clip 88 or 89. The inclined clip surfaces 92 co-act to engage and hold the stud 91 and thereby trim strip 90 firmly to surfaces 80 and 82 of panel 77. Trim strip 90 is also provided with parallel vertically spaced bumpers 93 and a flange portion 94 overlying top surface 78.

As is shown in FIGS. 28 and 30, the vertical surfaces 81 and 83 of panel 77 are formed with a plurality of vertical recesses 95 and a connecting clip or pin 97 is secured therein by screws 96. Horizontal recesses 98 opening into surfaces 81 and 83 and bottom surface 79 and of a depth about equal to the vertical dimension of flange 24 of bracket 4 are provided in panel 77 and are designed to permit the panel to overlie flanges 24 and to be supported by the flanges in flush relation with the top of the bracket. In the illustration of FIGS. 40 and 41, connecting clips or pins 97 are aligned with and inserted into opening 99 provided in flanges 24. Clips or pins 97, when engaged in the flange openings, serve to prevent the lateral displacement of panel 77 with respect to either of the brackets when the panel has been positioned between side walls 19 of a pair of brackets 4, and the surfaces defining recesses 98 rest upon flanges 24.

Referring again to FIG. 25, vertical panels, generally designated 100, are shown in their normal installed position. The overall construction of vertical panels 100 is shown with more particularity in FIGS. 31, 32 and 33 and the details of installation in FIGS. 40 and 41. As shown in FIGS. 40 and 41, panel 100 consists of parallel spaced vertical surfaces 101 and 102 connected by surfaces 103, 104, 105 and 106, best seen in FIGS. 32 and 33.

The same composite, laminated and honeycomb cored construction used in connection with horizontal panel 77 is also ordinarily used in the fabrication of panels 100 although other common panel construction materials can be employed. While this cored construction produces a high strength lightweight unit, solid panels may be employed. For purposes of clarity and continuity the same reference characters used to identify the wood edge portions and honeycomb core portions have been adopted for all panels since the construction involved is basically the same.

As illustrated in FIG. 33 horizontal end surfaces 103 and 105 are routed to provide recesses 107 and 108 extending the length of the respective surfaces and about midway between vertical surfaces 101 and 102. To mount a vertical panel 100 between a pair of brackets 4, as shown in FIGS. 33, 40 and 41, the panel is aligned to permit the insertion of the portion of the bracket defined by the underside of flanges 24, the side walls 19 extending downwardly therefrom, and bottom walls 20 into recess 108 and to establish the abutment of end surface 105 with the underside of flanges 24. The insertion or removal of vertical panels from the structural arrangement can be accomplished without displacing the poles from their predetermined positions.

The alignment of end surface 103 and recess 107 with a bracket spaced above end surface 105 and recess 108 is shown in FIG. 41. In the construction shown, horizontal panels 77 are connected to the bracket 4 in the manner described above. An insert member 25, as shown in FIG. 6, is connected to bracket 4 utilizing the resilient engagement of dove-tail 26 of insert 25 and dove-tail slot 23 of the bracket. When in position, insert member 25, in effect, serves as a vertical extension of bracket 4. The dimensions of insert 25 are equal to those of recess 107 and produce the precise alignment of end surface 103 of vertical panel 100 with top surface 78 of horizontal panel 77. A pin 109 passing transversely through panel 100 and insert 25 acts to maintain the relative positions of the panel and the insert. Similar pins, not shown, are used to anchor the vertical panels to the bracket 4. It has been found, however, that pins 109 can be omitted without affecting the support arrangement. In some instances where horizontal panels are not used, insert 25 can be eliminated and the upper end of bracket 4 can be inserted in recess 107. The end surface 103 of the panel will then abut the top surface of flange 24.

As can be seen in FIGS. 40 and 41, the alignment of the vertical panels 100 and horizontal panels 77 is precise. The resulting unit is strong, rigid, light in weight and easy to assemble and disassemble.

The installation of back panels 110 is shown in FIGS. 25, 26 and 27. The detailed construction of the panels 110 is shown in FIGS. 37, 38 and 39. The composite, laminated honeycomb core construction is preferably employed as discussed above with respect to panels 77 and 100. Back panel 110 has a vertical back surface 111 and front surface 112. These surfaces are connected by top surface 113, bottom surface 114 and sides 115 and 116.

As is shown in FIGS. 37 and 38, back surface 111 is provided with a series of rectangular recesses 117 adjacent the corners of the panel. Securement fixtures or clips 118, having a configuration roughly similar to a Z in appearance, are installed within each of the recesses 117. One of the legs 119 of a clip 118 is secured in each of the recesses in a manner such that the clip is flush with the back surface 111. The outer leg 120 projects from the side of the panel and is provided with an opening 121. As illustrated in FIGS. 26, 27 and 37, the legs 120 of securement fixtures or clips 118 projecting from side 115 have a triangular configuration complementing the triangular configuration of the corresponding legs of the clips projecting from side 116 whereby two clips can be secured to a pole and will occupy substantially the same vertical space. This complementing angularity of the clip legs 120 permits the installation of back panels 110 in side-by-side relationship between a plurality of spaced vertical poles with the surfaces 113 and 114 located in alignment.

FIGS. 26, 27 and 38 illustrate the connection of back panels 110 to poles 75 of the wall mounting variety. A bolt 122 is passed through opening 121 of the leg 120 of the securement fixture of clip and through the slot of pole 75 which communicates with the receiving chamber thereof. The bolt 122 is threaded into an enlarged nut 123 in the receiving chamber and spanning the slot. The bolts 122 associated with each of the clips are loosely connected to their respective clips and the desired vertical alignment of panel 110 with respect to poles 75 is established. Bolts 122 are then threaded into their respective nuts to draw the nuts 123 and legs 120 in opposing engagement with the walls of pole 75 defining the slot thereof to rigidly secure the clips 118 and panel 110 to poles 75. As mentioned above, the complementing angularity of legs 120 on opposite sides of the panel will permit the installation of another panel immediately adjacent the first back panel and in alignment with its top and bottom surfaces.

Referring to FIGS. 26, 34, 35 and 36, a drop front panel, generally designated 125, is shown. The panel 125 is used for a drop front for a housing formed by spaced horizontal panels 77, vertical panels 100 and back panel 110. However, while a drop front panel is shown, the panel 125 could be hinged at its top corner instead of at its bottom corner to produce a lift front panel where desired.

The drop front panel 125, as shown in FIGS. 34, 35 and 36, consists of a front and back surface 126 and 127, respectively, top surface 128, bottom surface 129 and sides 130 and 131. As can best be seen in FIG. 35, panel sides 130 and 131 are recessed and provided with channel members 132 and 133, respectively. The channel members extend from top surface 128 to bottom surface 129 along each of the sides 130 and 131 and are ordinarily fabricated from aluminum, an aluminum alloy or other extrudable metal. Other metals, plastic or wood may be used to form the channel members, however. The channel members 132 and 133 are designed to serve as a track for a roller or slide device connected to the pivot or support arm shown in FIG. 25 which moves as the drop front panel is either lowered or raised.

As is shown, drop front panel 125 is hinged at 134 and 135 by flanged plates secured to pole 11 and having configurations complementing the securement fixtures or clips 118. These plates are also ordinarily formed with complementing angularities to permit two of such hinge plates to be positioned adjacent to and in alignment with each other on the same pole or to permit their mating alignment with other pole connected securement fixtures such as clips 118. Co-acting hinge plates (not shown) are secured to panel sides 130 and 131 near the bottom surface thereof and are pivotally connected in a conventional manner to the hinge plates secured to pole 11.

A pair of pivot and support arms 136 and 137, shown in FIG. 25, are pivotally mounted on poles 11 above hinges 134 and 135. This mounting of the arms utilizes securement fixtures similar to those employed for back panels 110 and hinges 134 and 135 in that the portion of the pivotal mounting plate spanning slot 18 of pole 11 and overlying surface 15 thereof is cut at an angle such that two plates having complementing angularity can be secured to the same pole and provide a pair of pivot points at the same level on the pole. However, in some of the structural arrangements of the invention, a pivot and support arm such as 137 may be secured to a pole by a securement fixture at a particular level on a pole and a hinge such as 134 from an adjacent drop front panel such as 125 can be connected at the same level on the pole by a securement fixture in mating engagement with the pivot arm securement fixture. The complementing configuration of these securement fixtures therefore produces substantial versatility and space savings in erecting the structures of the invention since one such fixture having one function can be mounted opposite another having another function. Also, while the securement fixtures have been described as being preferably pole mounted, certain applications may utilize the edges of panels for mating mounting of the fixtures.

The ends of pivot and support arms 136 and 137 are connected to rollers, not shown, positioned within the channels provided by channel members 132 and 133 in a conventional manner. The channels are provided with stops, not shown, to stop the movement of the rollers when the drop panel 125 has been lowered to a predetermined level. Arms 136 and 137 then serve to support panel 125 and anything placed upon it in its predetermined open position.

While a drop front panel has been discussed above as well as its interchangeability to a lift front panel, a number of closures, including fixed panels, sliding panels or doors or combinations of both can be utilized in the structural arrangement of the invention. These items may employ the composite, laminated honeycomb construction of the above panels, may be solid glass, or wood, etc. FIGS. 25, 42, 43, 44 and 46 through 50 illustrate a number of combinations of fixed and sliding front panels.

The front panel arrangement illustrated in FIG. 43 consists of a channel member 140 having a laterally projecting stud 141 extending substantially the entire length of the member which is inserted in a recess 86 of a horizontal panel 77. The channel member 140 and stud 141 are retained in engagement with surface 82 of the panel by the inclined surfaces 92 of spring clip 818 in cooperation with flange 142 in the same manner as trim strip 90, shown in FIG. 45, is secured to a horizontal panel.

Channel member 140, as is the case with each of the channel members illustrated in FIGS. 42, 43, 44 and 46 through 50, is ordinarily fabricated from an aluminum or aluminum alloy extrusion, although plastic or other extrudable materials may be used. Channel member 140 is formed with a pair of opposed top and bottom channels 143 and 144, respectively. Elongated, generally U-shaped plastic extrusions 145 and 146 are secured in spaced relation in each of the channels 143 and 144 and serve both as panel guides and to prevent panel rattle in the channels. As is shown in FIG. 43, the bottom portion of a fixed panel 146 rests on and is engaged by extrusion 145 while the top portion of a panel 147 is supported in a vertical position by extrusion 146.

A version of a combination channel member-trim strip is shown in FIGS. 25 and 44. The combination member 148 is secured to a horizontal panel 77 in the same manner described with respect to trim strip 90 and channel member 140. Member 147 includes a flange 149, bumper 150, and stud 151 which are similar in all respects to the upper portion of trim strip 90. From a point spaced below stud 151, an outwardly extending flange 152 is provided with depending walls 153 and 154 which form downwardly opening channels 155 and 156. Elongated plastic extrusions 157 are secured in channels 155 and 156 and support panels 158 in a vertical upright position. Bumper 150 is used in connection with a lift front panel 125 described above.

Modifications of the members 140 and 148 are shown in FIGS. 47, 49 and 50. In FIG. 50, channel member 159 contains only a single channel 160 and extrusion 161 which supports a single panel 162. Member 163 of FIG. 47 contains a single channel 164 which opens upwardly adjacent support flange 165. An elongated plastic extrusion 166 is positioned in channel 164 and grips and maintains panel 167 in a fixed position. The bottom portion of member 163 is provided with a bumper 168 against which a drop front panel 125 rests when in the closed position shown.

Channel member 169 of FIG. 49 includes a pair of downwardly opening channels 170 and 171 each containing a plastic extrusion 172 for the vertical support of panels 173. An upwardly opening channel 174 containing a plastic extrusion 175 grips and maintains panel 176 in a fixed vertical position.

Provision for sliding panels is made in the embodiments illustrated in FIGS. 42, 46 and 48. The mode of securing the channel members of these embodiments to horizontal panels is the same as that described in connection with trim strip 90 and channel members 140, 148, 159, 163 and 169 and will, therefore, not be repeated.

FIG. 42 shows a channel member 177 which has a depending channel 178 and a pair of upwardly opening channels 179 and 180. The depending channel contains an elogated plastic extrusion 181 which supports a panel 182 in an upright position. The upwardly opening channels 178 and 180 are formed with projections 183 extending upwardly from the channel bases. The apex of each of the projections 183 is depressed to form a groove into which roller bearings 184 contained by a race 185 are mounted. Sliding panels 186 and 187 are provided with sheaths 188 and 189 along the bottom edges thereof. The outer surfaces of sheaths 188 and 189 are grooved to complement the construction of projections 183 to provide a track for the roller bearings 184 upon which each of panels 186 and 187 slidably rest. With this construction the sliding panels can be easily and smoothly opened and closed by sliding the panels over the roller bearings 184.

The channel member 188 shown in FIGS. 25 and 46 is basically similar to that shown in FIG. 42. In this instance, however, the depending channel has been eliminated and replaced by a bumper 189. The bumper 189 acts as an abutment for drop front panel 190 when in closed position.

As is illustrated in FIG. 48, a channel member 191, which is basically similar in function and manner of support, to members 177 and 188, is provided with a pair of downwardly opening channels 192 and 193 containing extrusions 194 for supporting panels 195 and 196 in an upright position. Plastic extrusions 194 permit the firm sliding motion of the panels when they are opened or closed and inhibit the loose, rattling movement of such panels. A pair of channels 197 and 198 open upwardly from channel member 191 and through roller bearings 199 support panels 200 and 201 for opening and closing sliding motion.

Another structural arrangement of the type shown in FIG. 25 is illustrated in FIG. 51. This arrangement of the invention, however, includes a tip-out drawer, generally designated 205, and sliding drawers 206 and 207 supported between pairs of poles 11 and 75 and brackets 4. The tip-out drawer 205 is illustrated in dotted lines in its open position and in solid lines in its closed position.

The tip-out drawer 205 shown in FIG. 51 consists of a front 208, sides 209, a back 210 and a base 211. The drawer may also contain a number of partitions (not shown) located in spaced relationship with respect to front 208 and back 210. As is shown in FIG. 52, a quarter gear segment 212 of a circular gear is secured to tip-out drawer side 209 by bolts 213. A similar segment is secured in like manner to the opposite side of the tip-out drawer.

When drawer 205 is installed in the structural arrangement shown in FIG. 51, gear segment 212 is pivotally supported upon a gear rack 214 secured to securement fixture or flanged plate 215 which in turn is bolted to surface 106 of vertical panel 100, shown in FIGS. 31, 32 and 33. Plate 215 is fabricated with a pair of generally triangular flanges 216 which are secured by bolts 217 to surface 106 of the vertical panel. While securement fixture of flanged plate 215 is shown in this embodiment to be secured to edge 106 of vertical panel 100, triangular flange 216 may easily be secured to pole 11 in a manner similar to that employed with respect to other securement fixtures such as clips 118, as shown in FIGS. 26 and 27, and hinge plates 134 and 135, as shown in FIG. 25. This can be accomplished by reversing the direction of projection of bolts 217 180 degrees and threading the bolts 217 into a nut 123 located in a pole chamber as shown in FIG. 26. Gear rack 214, plate 215 and stop plate 218 are thereby fully supported by the pole as are drawer 205 and gear segments 212. Due to the configuration of flanges 216, a second plate having flange configurations complementing those of flanges 216 can be secured to panel 100 or pole 11, when a pole connection is employed, at the same level thereon and provide a structural arrangement with a pair of tip-out drawers adjacent to each other. Since the configuration of triangular flanges 216 complements the configuration of the other securement fixtures, fixtures having diverse functions can be secured opposite each other in mating relationship on the same pole or panel and will occupy the same vertical space. Plate 215 is further provided with a flanged generally horizontal stop plate 218.

As can be seen in FIGS. 51 and 52, tipper drawer 105 rotates 90 degrees about its pivotal axis on rack 214 and is maintained in either its open or closed position by the offset advantage produced by the offset location of the pivot point of the drawer with respect to the body of the drawer. Therefore, when opening the drawer by rotating the front 208 in a downward arc, assuming a balanced load in the drawer, the effort required is at a minimum as it is during the closing of the drawer. Over balance weight 219 facilitates the positive obtaining of a fully opened and closed drawer position.

When the drawer is rotated to its open position, as shown in FIG. 51, gear segment 212 rolls 90 degrees from the closed position shown in FIG. 52, wherein further movement is prevented by stop 218, forwardly until the opposite end of gear segment 212 engages and is stopped by stop 218. This is accomplished with the aid of over balance 219 and the offset location of the drawer pivot. In the open position, the outermost end of the drawer projects beyond the plane defined by poles 11 and the contents are thereby made more readily accessible. In closed position front 208 of the drawer is positioned substantially flush with the plane of the poles after gear segment 212 rolls backwardly to its FIG. 52 position.

Drawers 206 and 207 of the structural arrangement of the invention are rolled inwardly and outwardly with respect to poles 11 and 75 on any conventional rollers or slides connected between the drawers and vertical panels 100.

The structural arrangement of the invention therefore provides a system where an infinite combination of supports, enclosures, closures, etc. can be employed depending upon specific needs. The elements of the structural arrangement of the invention are for the most part interchangeable, and the interchange of the elements can be generally accomplished without displacement of the basic pole structure.

Various modes of carrying out the invention are contemplated as being within the scope of the following claims particularly pointing out and distinctly claiming the subject matter which is regarded as the invention.

I claim:

1. A structural arrangement comprising a first pair of upstanding generally vertical poles, a second pair of poles in laterally spaced parallel alignment with the first pair of poles, one of the poles of the first pair being connected to the pole of the second pair positioned in alignment therewith by a generally horizontally extending first bracket, the other of the poles of the first pair being similarly connected to the other of the poles of the second pair by a generally horizontally extending second bracket and in horizontal alignment with the first bracket, the connecting first and second brackets being provided with transversely extending panel supporting elements, the elements of the first bracket being disposed in generally horizontal alignment with the elements of the second bracket, a panel mounted between the pairs of poles and upon the elements of the brackets, the edges of the panel adjacent the supporting elements of the first and second brackets being recessed to complement the configuration of the transverse elements upon which the panel is mounted, and connecting means disposed between the panel and the brackets for rigidly securing the panel to the brackets and between the poles, the first and second brackets have generally rectangular cross-sectional configurations, two of the surfaces of each of the connecting brackets extend in a generally vertical direction and the transverse supporting elements of the first and second brackets disposed opposite each other project generally horizontally from the vertical bracket surfaces and in generally planar relationship with each other, the top surface of the panel being in flush relationship with the top surfaces of the first and second brackets between which it is supported.

2. The structural arrangement of claim 1 wherein the transverse supporting elements comprise flanges extending substantially the length of the bracket and between the ends of the vertical surfaces.

3. A structural arrangement compriisng a first pair of upstanding generally vertical poles, a second pair of poles in laterally spaced parallel alignment with the first pair of poles, one of the poles of the first pair being connected to the pole of the second pair positioned in alignment therewith by a generally horizontally extending first bracket, the other of the poles of the first pair being similarly connected to the other of the poles of the second pair by a generally horizontally extending second bracket and in horizontal alignment with the first bracket, the connecting first and second brackets being provided with transversely extending panel supporting elements, the elements of the first bracket being disposed in generally horizontal alignment with the elements of the second bracket, a panel mounted between the pair of poles and upon the elements of the brackets, the edges of the panel adjacent the supporting elements of the first and second brackets being recessed to complement the configuration of the transverse elements upon which the panel is mounted, and connecting means disposed between the panel and the brackets for rigidly securing the panel to the brackets and between the poles, the first and second brackets have generally rectangular cross-sectional configurations, two of the surfaces of each of the connecting brackets extend in a generally vertical direction and the transverse supporting elements of the first and second brackets disposed opposite each other project generally horizontally from the vertical bracket surfaces and in generally planar relationship with each other, the transverse supporting elements comprising flanges extending substantially the entire length of the bracket and between the ends of the vertical surfaces, the flanges being provided with a plurality of longitudinally spaced openings, vertically extending plates secured to the edges of the panel adjacent the vertical bracket surfaces and in longitudinally spaced relationship, the plates having upper extremities disposed below the top surface of the panel and lower extremities projecting into the recesses of the panels, the lower extremities of the plates being aligned with and inserted in said spaced openings of the flanges in close fitting relationship therewith to provide a rigid panel mounting resistant to horizontal displacement.

4. A structural arrangement comprising a pair of upstanding generally vertical poles, a bracket connected between the poles in generally horizontal relationship therewith, the bracket having a generally rectangular cross section with two of the surfaces thereof extending generally vertically, a supporting element projecting horizontally from one of the vertical bracket surfaces from a location below the upper surface thereof, a vertical panel having parallel vertically upstanding surfaces and horizontal connecting surfaces, a recess provided in one of the horizontal connecting surfaces, the bracket being inserted into the recess of the panel and the portion of the bracket above said element conforming to the surfaces defining the recess, a portion of the horizontal surface of the panel adjacent the recess being supported by the supporting element whereby the panel is vertically supported between the poles.

5. The structural arrangement of claim 4 wherein the bracket includes a second supporting element projecting transversely from the other vertical surface of the bracket in horizontal alignment with the first-named supporting element, the recess of the panel being spaced midway between the upstanding surfaces thereof, the panel straddling the bracket and being supported by the bracket portion in the recess and the supporting elements.

6. The structural arrangement of claim 4 wherein a second bracket is spaced above the first bracket, the panel is provided with a recess in the opposite horizontal connecting surface and the panel is inserted between the brackets which project into the recesses and is rigidly supported between the brackets.

7. A structural arrangement comprising a pair of upstanding generally vertical poles, a bracket connected between the poles in generally horizontal relationship therewith, the bracket having a generally rectangular cross section with two of the surfaces thereof extending generally vertically, a supporting element projecting from one of the vertical bracket surfaces, a vertical panel having parallel vertically upstanding surfaces and horizontal connecting surfaces, a recess provided in one of the horizontal connecting surfaces, the bracket being inserted into the recess of the panel and conforming to the surfaces defining it, a portion of the horizontal surface of the panel adjacent the recess being supported by the supporting element whereby the panel is vertically supported between the poles, a second bracket spaced above the first bracket, said panel having a recess in the opposite horizontal connecting surface and being inserted between the brackets, said brackets projecting into the recesses so that if the panel is rigidly supported between the brackets, said second bracket having generally horizontal surfaces connecting the vertical surfaces thereof, one of the horizontal surfaces being provided with a slot, an insert member inserted into the slot and having a portion projecting therefrom, the projecting portion of the insert member serving to extend the vertical dimension of the bracket to permit the installation and support thereon of a second vertical panel in the same plane as the first panel and on an opposite side of the bracket.

8. The structural arrangement of claim 7 including a plurality of brackets in vertically spaced relationship between the poles, insert members connected to one of the horizontal surfaces of the brackets, a vertical panel secured to and supported between each pair of spaced brackets and inserts.

9. A structural arrangement comprising a pair of upstanding parallel poles, a panel connected to the poles in a plane parallel to that of the poles, the panel having a plurality of plates connected thereto and having portions projecting from the sides thereof, the portions projecting from one side of the panel and secured to one of the poles having a configuration complementing that of the portions projecting from the other side of the panel and secured to the other pole whereby an additional panel can be secured to either of the poles in alignment with the first panel and the plate configuration of the second panel will complement that of the first panel.

10. The structural arrangement of claim 9 wherein the cross section of the plates has a generally Z-shaped configuration, one of the legs of the Z being connected to the back of the panel, one of the legs being connected to the front of the pole, and the other of the legs lying along a surface of the panel.

11. A structural arrangement comprising a first pair of upstanding generally vertical poles, a second pair of poles in laterally spaced parallel alignment with the first pair of poles, one of the poles of the first pair being connected to the pole of the second pair in alignment therewith by a generally horizontally extending first bracket, the other of the poles of the first pair being similarly connected to the other of the poles of the second pair by a generally horizontally extending second bracket and in horizontal alignment with the first bracket, the first and second brackets having generally rectangular cross-sectional configurations, two of the surfaces of each of the brackets extending in a generally vertical direction and having transverse supporting elements projecting from the generally vertically directed surfaces, a generally horizontal panel mounted between the pairs of poles and upon the elements of the brackets, the edges of the panel adjacent the supporting elements of the first and second brackets being recessed to complement the configurations of the elements upon which the panel is mounted, connecting means projecting into the recesses and into openings provided in the support elements for rigidly securing the panel to the brackets and between the poles, a generally vertically directed panel having parallel vertically upstanding surfaces and horizontal connecting surfaces and having a recess provided in one of the horizontal connecting surfaces mounted upon each of the brackets, each of the brackets being inserted into the recess of the panel and conforming to the surfaces defining it, third and fourth brackets connected between the pole pairs and spaced above the first and second brackets, the vertical panels being supported between the first and second and third and fourth brackets, a second horizontal panel mounted between the pairs of poles and the third and fourth brackets, the vertical panels having surfaces abutting both of the horizontal panels, a back panel connected to the poles in a plane parallel to that of the poles and between the horizontal panels, the back panel having a plurality of plates connected thereto and having portions projecting from the sides thereof, the projecting portions of one side having configurations complementing those of the other side and the projecting portions of one of the sides being secured to one of the poles and the projections of the other of the sides secured to another of the poles whereby an open ended rigid enclosure supported between the pole pairs is produced.

12. The structural arrangement of claim 11 wherein a plurality of open ended enclosures are secured to and supported between the pairs of poles, some of the enclosures having back panels and others of the enclosures having two open ends.

13. The structural arrangement of claim 11 wherein a third pair of poles is provided and another open ended enclosure is secured adjacent the original enclosure with one of the vertical panels of the original enclosure serving as a common wall.

14. The structural arrangement of claim 13 wherein a plurality of open ended enclosures are supported between the first, second and third poles, some of the enclosures having back panels and others of the enclosures having two open ends, and wherein enclosures separated by the common wall are at different levels.

15. The structural arrangement of claim 14 wherein some of the open ended enclosures are provided with front panels closing the open end thereof.

16. The structural arrangement of claim 11 wherein the panels are connectable to and removable from the arrangement without displacement of the poles.

17. A structural arrangement comprising a first pair of upstanding generally vertical poles, a second pair of poles in laterally spaced parallel alignment with the first pair of poles, one of the poles of the first pair being connected to the pole of the second pair in alignment therewith by a generally horizontally extending first bracket, the other of the poles of the first pair being similarly connected to the other of the poles of the second pair by a generally horizontally extending second bracket and in horizontal alignment with the first bracket, the first and second brackets having generally rectangular cross-sectional configurations, two of the surfaces of each of the brackets extending in a generally vertical direction and having transverse supporting elements projecting from the generally vertically directed surfaces, a generally horizontal panel mounted between the pairs of poles and upon the elements of the brackets, the edges of the panel adjacent the supporting elements of the first and second brackets being recessed to complement the configuration of the elements upon which the panel is mounted, connecting means projecting into the recesses and into openings provided in the support elements for rigidly securing the panel to the brackets and between the poles, a generally vertically directed panel having parallel vertically upstanding surfaces and horizontal connecting surfaces and having a recess provided in one of the horizontal connecting surfaces mounted upon each of the brackets, each of the brackets being inserted into the recess of the panel and conforming to the surfaces defining it, third and fourth brackets connected between the pole pairs and spaced above the first and second brackets, the vertical panels being supported between the first and second and third and fourth brackets, and a second horizontal mounted between the pairs of poles and the third and fourth brackets, the vertical panels having surfaces abutting both of the horizontal panels, whereby a rigid enclosure having open ends supported between the pole pairs is produced.

18. The structural arrangement of claim 17 wherein a third pair of poles is provided and another open ended enclosure is secured adjacent the original enclosure with one of the vertical panels of the original enclosure serving as a common wall.

19. The structural arrangement of claim 18 wherein some of the open ended enclosures are provided with front panels closing the open end thereof.

20. The structural arrangement of claim 17 wherein the panels are connectable to and removable from the arrangement without displacement of the poles.

References Cited

UNITED STATES PATENTS

| | | | |
|---|---|---|---|
| 2,248,671 | 7/1941 | Hohl | 52—475 |
| 2,925,920 | 2/1960 | Skubic | 211—148 X |
| 3,194,407 | 7/1965 | D'Altrui | 211—148 |
| 3,274,741 | 9/1966 | Neagle | 52—242 |
| 3,458,052 | 7/1969 | Kann | 211—176 |

FOREIGN PATENTS

| | | |
|---|---|---|
| 1,142,107 | 2/1956 | France. |
| 1,311,348 | 10/1961 | France. |
| 1,441,255 | 7/1965 | France. |

FRANK L. ABBOTT, Primary Examiner

S. D. BURKE, Assistant Examiner

U.S. Cl. X.R.

211—176; 108—141, 148